(12) United States Patent
Lyren

(10) Patent No.: US 9,276,973 B2
(45) Date of Patent: Mar. 1, 2016

(54) PEER-TO-PEER DATA STORAGE

(71) Applicant: Philip Scott Lyren, Bangkok (TH)

(72) Inventor: Philip Scott Lyren, Bangkok (TH)

( * ) Notice: Subject to any disclaimer, the term of this patent is extended or adjusted under 35 U.S.C. 154(b) by 315 days.

(21) Appl. No.: 13/853,116

(22) Filed: Mar. 29, 2013

(65) Prior Publication Data
US 2014/0297742 A1 Oct. 2, 2014

(51) Int. Cl.
*H04L 29/06* (2006.01)
*H04L 29/08* (2006.01)

(52) U.S. Cl.
CPC .......... *H04L 65/403* (2013.01); *H04L 67/1044* (2013.01)

(58) Field of Classification Search
CPC .................................................. H04L 63/403
USPC .......................................... 709/204, 214, 216
See application file for complete search history.

(56) References Cited

U.S. PATENT DOCUMENTS

| | | | |
|---|---|---|---|
| 8,997,007 B1 * | 3/2015 | Bennett et al. ................. 715/753 |
| 2002/0114341 A1 * | 8/2002 | Sutherland .............. H04L 41/00 370/428 |
| 2003/0105829 A1 * | 6/2003 | Hayward ...................... 709/214 |
| 2005/0091289 A1 * | 4/2005 | Shappell et al. .............. 707/201 |
| 2006/0075063 A1 * | 4/2006 | Grosse et al. ................. 709/217 |
| 2006/0195785 A1 * | 8/2006 | Portnoy ............... G06Q 10/107 715/700 |
| 2007/0168396 A1 * | 7/2007 | Adams .................. G06F 3/0607 |
| 2008/0133445 A1 * | 6/2008 | Pennington ........................ 707/1 |
| 2008/0147821 A1 * | 6/2008 | Dietrich et al. ............... 709/216 |
| 2008/0208963 A1 * | 8/2008 | Eyal ...................... G06Q 10/10 709/203 |
| 2008/0243420 A1 * | 10/2008 | Gokhale ............... G06F 3/0634 702/127 |
| 2009/0106425 A1 * | 4/2009 | Zuckerman ....... G06F 17/30206 709/226 |
| 2009/0157814 A1 * | 6/2009 | Lee ........................ G06Q 10/10 709/204 |
| 2010/0077101 A1 * | 3/2010 | Wang et al. .................... 709/238 |
| 2010/0094921 A1 * | 4/2010 | Roy et al. ...................... 709/201 |
| 2010/0138360 A1 * | 6/2010 | Cutler ................... G06F 3/0481 705/36 R |
| 2010/0332818 A1 * | 12/2010 | Prahlad et al. ................ 713/150 |
| 2011/0213945 A1 * | 9/2011 | Post ..................... G06F 3/0644 711/173 |
| 2013/0046615 A1 * | 2/2013 | Liyanage ........... G06Q 30/0242 705/14.45 |

FOREIGN PATENT DOCUMENTS

CN 101610162 A * 12/2009
GB 2454602 A * 5/2009

OTHER PUBLICATIONS

Thomas Mager, "A Measurement Study of the Wuala On-Line Storage Service" International Conference on Peer-to-Peer Computing, Sep. 3-5, 2012, Tarragona, Spain.

Sven Seuken, "Market Design & Analysis for a P2P Backup System", Jun. 7-11, 2010, Cambridge, Massachusetts, USA.

* cited by examiner

Primary Examiner — Kostas Katsikis

(57) ABSTRACT

A determination is made of users that form a group within a social network in which the users communicate with each other over a network with electronic devices in a client-server architecture. The users in the group within the social network form a peer-to-peer (P2P) storage group within a P2P storage network. In the P2P storage network, users are peers that act as a client and a server for each other.

17 Claims, 10 Drawing Sheets

US 9,276,973 B2

PEER-TO-PEER DATA STORAGE

BACKGROUND

The rapid expansion of digital information has caused a large demand for data storage. In order to satisfy this demand, enormous amounts of data are stored across thousands and thousands of data centers. These data centers consume massive amounts of energy and account for a significant percentage of electrical load being consumed across the United States. Unfortunately, these data centers are costly to run and inefficient in their use of power. They waste large amounts of electricity and contribute to environmental pollution.

Other systems and methods to store digital information can reduce the burden on data centers.

SUMMARY OF THE INVENTION

One example embodiment is a method that determines members that form a group within a social network in which the members communicate with each other over a network with electronic devices in a client-server architecture. A peer-to-peer (P2P) storage network is formed from the group of members within the social network. The members of the group in the social network become peers in the P2P storage network.

DETAILED DESCRIPTION

Example embodiments include systems, apparatus, and methods that store data on peer-to-peer (P2P) networks.

Users or peers in a P2P network store digital data on personal storage devices of each other. A user in a P2P network can backup across storage devices of other peers in the P2P network without using a central server. Data is thus stored on electronic devices of peers, as opposed to storing this data on a storage server or in data center. P2P storage thus offers an alternative to storing and backing up data at a single or central location, such as a data center.

Figure 1:
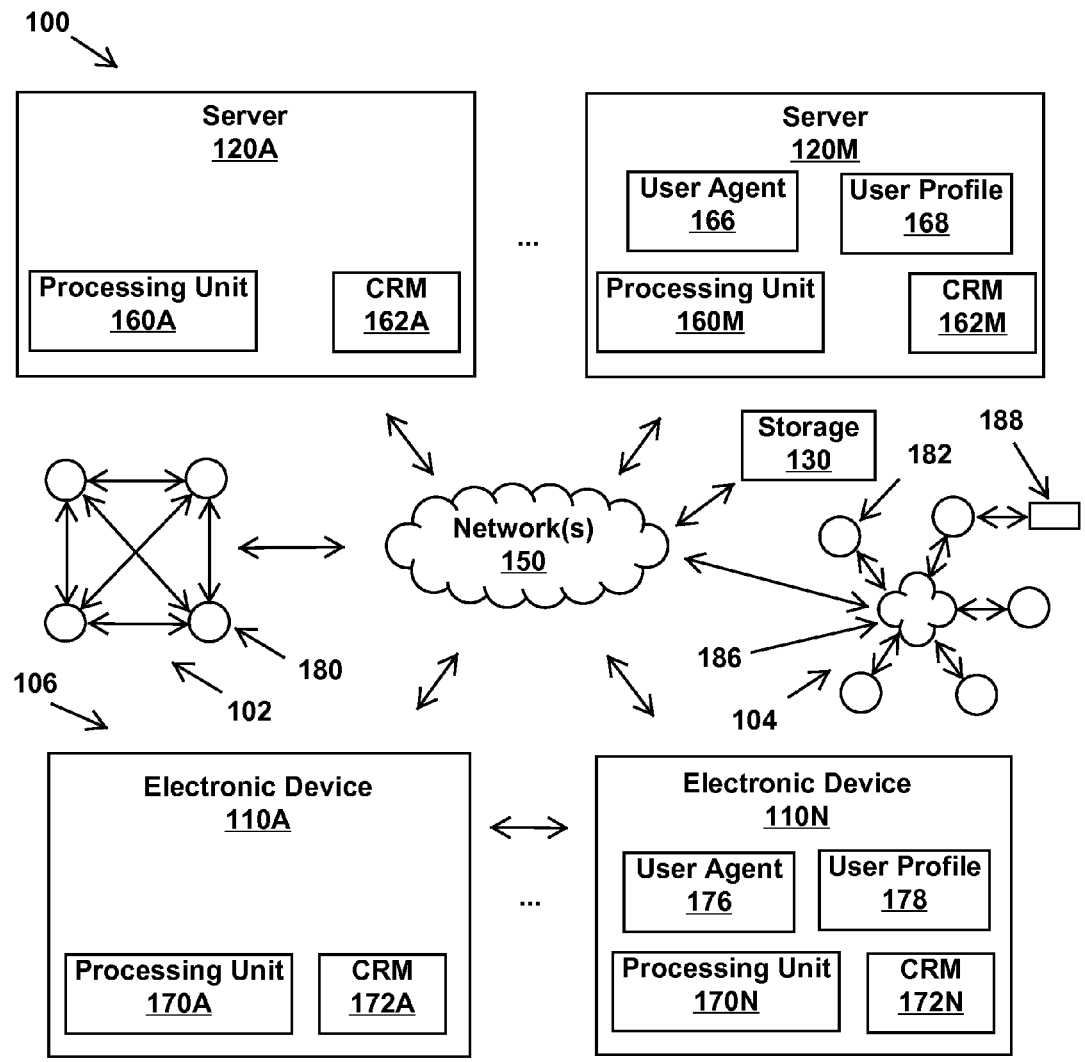
FIG. 1 is a computer system that includes one or more P2P networks and/or P2P storage systems in accordance with an example embodiment.

FIG. 1 is a computer system 100 that includes one or more P2P networks and/or P2P storage systems in accordance with an example embodiment. The computer system includes P2P groups, P2P storage systems, and/or P2P networks 102, 104, and 106, a plurality of electronic devices 110A to 110N (such as peers in one of the groups, storage systems, and/or networks), a plurality of servers 120A to 120M, and storage 130 in communication with each other through one or more networks 150. The electronic devices, servers, P2P networks, and storage communicate with each other through the networks to execute blocks and methods discussed herein.

The servers 120A to 120M include a processor unit with one or more processors and computer readable medium (CRM), such as random access memory and/or read only memory. Server 120A includes processor unit 160A and CRM 162A, and server 120M includes processor unit 160M and CRM 162M. The processing unit communicates with the CRM to execute operations and tasks that implement or assist in implementing example embodiments. One or more of the servers can also include a user agent and a user profile, such server 120M including user agent 166 and user profile 168.

The electronic devices 110A to 110N include a processor unit with one or more processors and computer readable medium (CRM), such as random access memory and/or read only memory. Electronic device 110A includes processor unit 170A and CRM 172A, and electronic device 110N includes processor unit 170N and CRM 172N. The processing unit communicates with the CRM to execute operations and tasks that implement or assist in implementing example embodiments. One or more of the electronic devices can also include a user agent and a user profile, such as electronic device 110A including user agent 176 and user profile 178.

By way of example, the electronic devices 110A to 110N include, but are not limited to, handheld portable electronic devices (HPEDs), portable electronic devices, computing devices, electronic devices with cellular or mobile phone capabilities, digital cameras, desktop computers, servers, portable computers (such as tablet and notebook computers), handheld audio playing devices (example, handheld devices for downloading and playing music and videos), personal digital assistants (PDAs), combinations of these devices, and other portable and non-portable electronic devices and systems.

By way of example, the networks 150 can include one or more of the internet, an intranet, an extranet, a cellular network, a local area network (LAN), a home area network (HAN), metropolitan area network (MAN), a wide area network (WAN), public and private networks, etc.

By way of example, the storage 130 can include various types of storage that include, but are not limited to magnetic storage and optical storage, such as hard disks, magnetic tape, disk cartridges, universal serial bus (USB) flash memory, compact disk read-only memory (CD-ROM), digital video disk read-only memory (DVD-ROM), CD-recordable memory, CD-rewritable memory, photoCD, and web-based storage. Storage can include storage pools that are hosted by third parties, such as an operator of a data center. The electronic devices and/or servers can use the storage to store files, software applications, data objects, etc. Storage can be accessed through a web service application programming interface, a web-based user interface, or other mechanisms.

The P2P groups, storage systems, and/or networks 102, 104, and 106 include a plurality of peers or nodes that communicate with each other. For example, the P2P group, storage system, and/or network 102 includes a plurality of peers or nodes 180, and the P2P group, storage system, and/or network 104 includes a plurality of peers or nodes 182. Electronic devices 110A to 110N in P2P group, storage system, and/or network 106 show examples of peers or nodes. In the P2P group, storage system, and/or network 102, peers communicate directly with each other, whereas in the P2P group, storage system, and/or network 104 peers communicate indirectly with each other, such as through a network 186 and/or network 150. Further, P2P group, storage system, and/or network 104 shows a node connected to and/or in communication with a peripheral or storage device 188.

In a P2P group, storage system, and/or network, a link exists between two nodes that know each other (e.g., node 1 knows the location of node 2 and can communicate directly or indirectly with node 2). The P2P group, storage system, and/or network can be a structured P2P network (such as a network with a specific overlay that organizes peers according to criteria and algorithms using distributed hash table based indexing) or an unstructured P2P network (such as a network that does not impose a structure on the overlay networks in which peers connect in an ad-hoc fashion). By way of example, the P2P group, storage system, and/or network can include P2P systems with a single routing layer with equal peers, centralized P2P systems with a central server that executes functions, and hybrid P2P systems that allow infrastructure nodes to exist. In the P2P groups, storage systems and/or networks, members or peers can provide resources, such as bandwidth, storage space, and/or computing power. Administrative duties can be designated to one or more peers, distributed across the peers, or designated to a P2P manager or system administrator (such as a manager or administrator in a server).

The computer system and/or P2P groups, storage systems, and/or networks maintain a file redundancy scheme in order to ensure that files are sufficiently available and not be lost, destroyed, or damaged. By way of example, erasure coding is used to reduce replication requirements in the systems, groups, networks. In erasure coding, messages of k symbols are transformed into longer messages or code words with n symbols such that the original message is recoverable from a subset of the n symbols.

Furthermore, the systems, groups, and/or networks can backup files using a compression and encryption scheme. For example, files are compressed and then encrypted with a private key that is provided to, accessed by, or known by the file owner. After the file is compressed and encrypted, it is erasure coded and then distributed in fragments or sections to other members or peers in the network.

Figure 2:
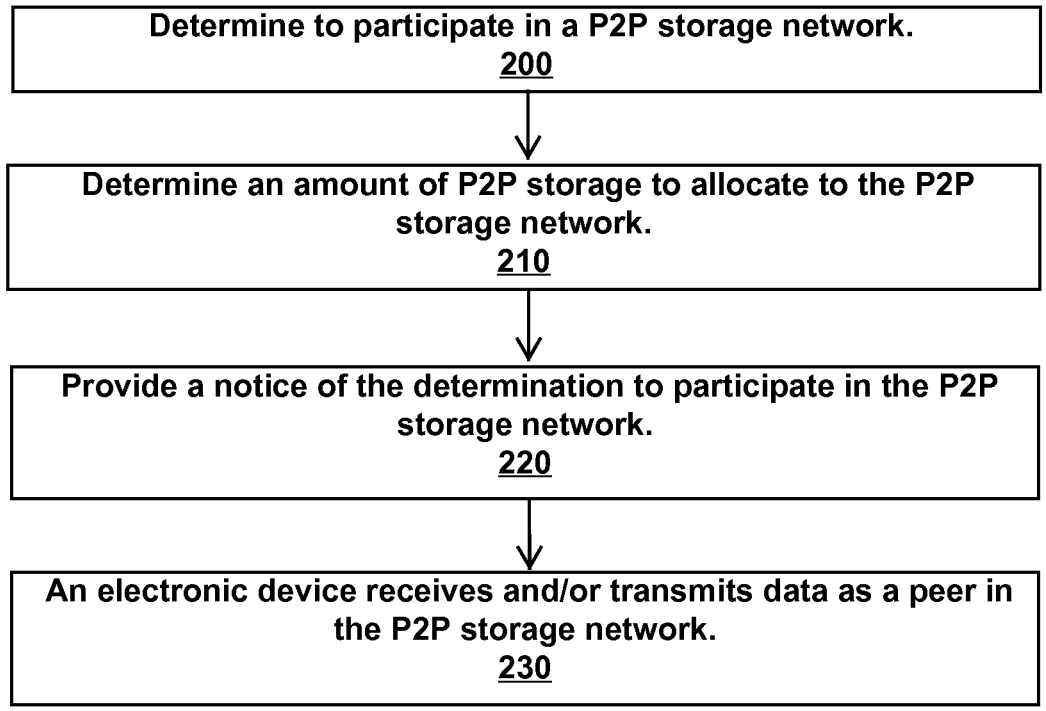
FIG. 2 is a method to determine an amount of P2P storage to allocate to peers in a P2P storage system in accordance with an example embodiment.

FIG. 2 is a method to determine an amount of P2P storage to allocate to peers in a P2P storage system.

According to block 200, a determination is made to participate in a P2P storage network. Participation in the P2P storage network includes allocating storage to a P2P network and/or consuming storage in the P2P network. The determination to participate in P2P storage can be made by a user of an electronic device (such as the owner or user of the electronic device that will consume and/or provide storage to the P2P network), a user agent of the user, a manufacturer of an electronic device (such as the electronic device that will consume and/or provide storage to the P2P network), a software application (such as the software application that executes on the electronic devices of users to enable electronic devices to consume and/or provide storage to the P2P network), an electronic device, a computer (such as a server), and/or an occurrence of another act.

Consider an example in which a user desires to backup data stored on a hard disk drive. Instead of purchasing a backup hard drive or storing the data on a cloud storage server, the user decides to join a P2P storage network and backup the data on this network.

Consider another example in which a user agent of a user monitors storage space of the user's electronic device and determines that this storage space is becoming full. The user agent decides to enroll the user in a P2P storage group in order to increase the amount of storage available to the electronic device. After the user agent joins the P2P storage group on behalf of the user, the user agent uploads a portion of the data stored on the storage space of the electronic device to peer devices in the P2P storage group. This process of moving data from the storage space of the electronic device to storage space in the P2P storage group frees up or makes available more local memory for use on the user's electronic device.

Consider an example in which a user purchases a new handheld portable electronic device (HPED), such as a new smartphone or a tablet computer. The HPED includes P2P storage software that automatically backs up data on the HPED to a P2P storage network. Storage of the data on the P2P storage network is set as a default position on the HPED. This default can be set, for example, by the manufacturer of the HPED or by the inclusion of the P2P storage software on the HPED.

Consider an example in which occurrence of another act determines participation in P2P storage. A user joins a social network, and the social network includes a default rule stating that users joining the social network also join a P2P storage group or network. Thus, members in the social network also become members of a P2P storage group in which users of the social network are peers that store data for each other.

According to block 210, a determination is made of an amount of P2P storage to allocate to the P2P storage network.

A variety of factors can be used to determine the amount of P2P storage to allocate to the P2P storage network. These factors include, but are not limited to, one or more of the following: an upper limit amount input from a user or determined by an electronic device and/or software program, an amount equal to or approximately equal to an amount of P2P storage already being consumed or intended to be consumed by an electronic device, a random amount, a predetermined amount, a mandatory minimum amount, a mandatory token amount which causes the device to register its space (and therefore itself) to the network (registration would provide a third party such as the hardware manufacturer or the network provider a measure of the number of activated potential units and how much each unit could potentially supply), an amount of available or free storage on one or more electronic devices, a ratio or percentage of available storage versus occupied storage, a type or model of electronic device, an amount of payment and/or compensation being received for the allocation, and an analysis of previous and/or historic data usage, upload bandwidth, download bandwidth, and/or historic network online time.

Consider an example in which a user has an HPED that communicates with a hard disk drive that is remotely located from the HPED. These two devices have a total storage capacity of one terabyte with five hundred gigabytes available. The HPED decides to allocate 100 gigabytes of this available storage to a P2P storage network. After this allocation, the HPED and hard disk drive have a total storage capacity of one terabyte with four hundred gigabytes available and one hundred gigabytes used and/or reserved for the P2P storage network.

Consider another example in which a user agent of a user monitors and tracks storage space on a tablet computer of a user. The user agent analyzes the storage history of this tablet computer over a time period, such as during and throughout the life of the tablet computer. This storage history includes, but is not limited to, one or more of total storage capacity, occupied storage capacity, available storage capacity, changes in occupied versus available storage capacity including rate of changes and time of changes, upload bandwidth, download bandwidth, processing speed, and time online and/or time connected to a network, such as the internet. Based on the analysis of this storage history, the user agent determines that the tablet computer can allocate thirty percent of its current available storage capacity to a P2P storage network.

Consider an example in which a user purchases a notebook computer that has a total storage capacity of one terabyte. The notebook computer has a predetermined amount of this storage capacity allocated for P2P storage, such as allocating 5%, 10%, 15%, 20%, etc. of the storage capacity to P2P storage. This allocation can be set by the manufacturer of the notebook computer and can be a default position that can be changed by the user, a software application, and/or the user agent. Alternatively, the allocation amount can be hardcoded and not changeable.

Consider an example in which the occurrence of another act determines an amount of storage to allocate to P2P storage. A user joins a P2P storage group, and this group includes a default rule that states users joining the group contribute a minimum amount of storage to the P2P storage group. This minimum amount of storage could be a percentage of an HPED's available physical and network storage (such as a percentage of the user's current available storage capacity) or a fixed amount of storage (such as a preset amount of 10 gigabytes, 20 gigabytes, . . . 100 gigabytes, 110 gigabytes, 120 gigabytes, . . . 500 gigabytes, 600 gigabytes, 700 gigabytes, 800 gigabytes, 900 gigabytes, 1 terabyte, 2 terabytes, etc.). Thus, the occurrence or act of joining the group triggers a default rule that determines the amount of storage.

Consider another example in which users who join the P2P storage group early get better or different storage terms. For example, users joining sooner get a larger ratio storage consumption to allocation than users joining later. For instance, the first one thousand users to join the P2P storage network receive a five to one ratio (5:1) of consumption to allocation. So, if a user joins first and allocates one terabyte to peer storage, then the user gets five terabytes of peer storage to consume. The second one thousand users to join the P2P storage network receive a four to one ratio (4:1) of consumption to allocation. The third one thousand users to join the P2P storage network receive a three to one ratio (3:1). The fourth one thousand users to join the P2P storage network receive a two to one ratio (2:1). Users joining thereafter receive a one to one ratio (1:1) of consumption to allocation.

Example embodiments include methods in which the decision to join a P2P storage network, the determination as to how much memory to consume and/or allocate in the P2P storage network, and the determination as to how much bandwidth to allocate to the P2P storage network are performed without knowledge of and/or instruction from a user. For example, a user agent for a user enrolls a user in a P2P storage group and allocates a portion of available memory for storage to peers in the P2P storage group. Furthermore, the user agent determines what percentages of the user's bandwidth are available to receive files from peers and upload files to P2P storage.

Furthermore, example embodiments include P2P storage networks in which users or peers in the network allocate and consume different amounts of data. Some users or peers allocate and/or consume more data than other users and peers in a same P2P storage network, while some users or peers allocate and/or consume less data than other users and peers.

Further yet, example embodiments include P2P storage networks in which users or peers in the network allocate and consume different amounts of bandwidth. Some users or peers allocate and/or consume more bandwidth to the P2P storage network than other users and peers, whiles some users or peers allocate and/or consume less bandwidth than other users and peers.

According to block 220, a notice is provided of the determination to participate in the P2P storage network. This notification can include the amount of P2P storage determined to be allocated to the P2P storage network. This notification can be transmitted and/or provided to a special "always on" P2P node, a server, a P2P manager that manages the P2P storage network, a software application associated with the P2P storage network, a user, and/or the peers in the P2P storage network. By way of further example, the notification is displayed to a person on a display of an electronic device, stored in memory, and/or transmitted over a network to a person and/or an electronic device.

According to block 230, an electronic device receives and/or transmits data as a peer in the P2P storage network. The electronic device receives and/or stores data per rules governing the participation of the electronic device in the P2P storage network. The electronic device stores for the peers an amount of data equivalent to the amount of storage allocated to the P2P storage network.

Figure 3:
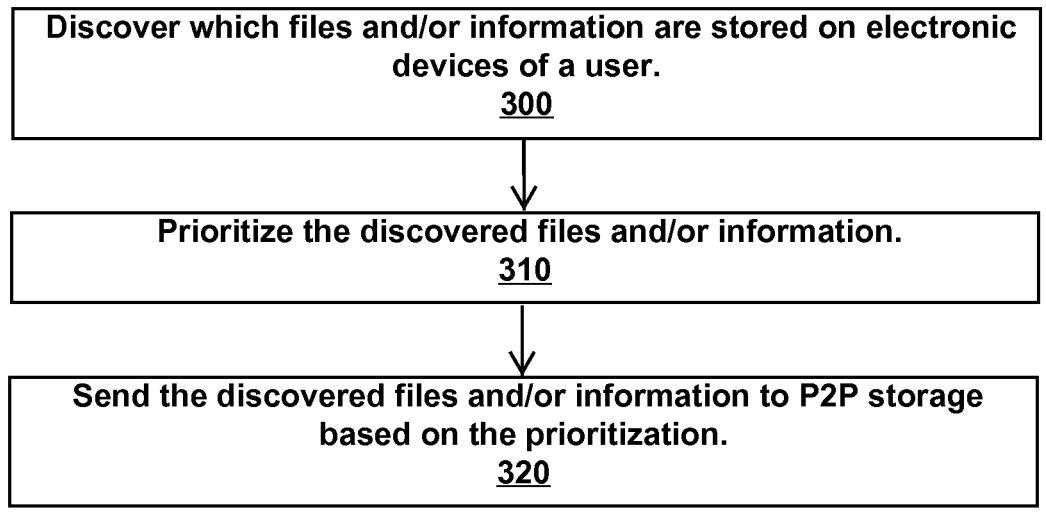
FIG. 3 is a method to determine which files and/or information to send to P2P storage in accordance with an example embodiment.

FIG. 3 is a method to determine which files and/or information to send to P2P storage.

According to block 300, a discovery is made in which files and/or information are stored on electronic devices of a user. The memories of the electronic devices of the user are searched to determine a location, a size, a type, and/or an identity of files and/or information being stored.

Files and/or information can be stored across different types of memory and/or storage including, but not limited to, primary storage (such as memory that includes Random Access Memory, RAM, and Read Only Memory, ROM), secondary storage (such as hard disks, magnetic tapes, solid state drives, Blu-ray disks, BDs, Digital Versatile Discs, DVDs, flash memory, and other storage devices external to the processor), and tertiary storage (such as Universal Serial Bus Flash Drives and other types of removable mass storage devices). These types of memory and/or storage are searched to discover files and/or information. Furthermore, the storage can be remote from the node (e.g., not physically fastened to the node). For example, the storage can be LAN storage, WLAN storage, and/or cloud storage. The node can dedicate which storage is allocated to the P2P network storage, including P2P storage dedicated to an electronic device from another P2P storage cluster or group.

A file can be identified using different types of methods depending, for example, on the type of file, a type of device storing the file, and/or the operating system. For instance, a file can be identified using a filename, a link that points to the file, an extension, a directory with a list of files and/or a list of links to files, a name and a path, etc.

A determination and/or identification of the types of files being stored can also be made. The types of files vary depending on the type of electronic device, the operating system, hardware installed, and the software installed on the electronic device. By way of example, the types of files include, but are not limited to, system files, program files, document files, multimedia files, regular and/or ordinary files, text files, binary files, executable files, directory files, and special files. Different types of files can have different extensions, such as ADM, ART, BAT, DAT, DOC, GIF, MID, MME, PDF, PPT, PNG, PXT, RTF, SCR, TIF, TXT, VSD, WAV, and XLS, to name a few examples.

According to block 310, the discovered files and/or information are prioritized.

Files and/or information can be prioritized based on one or more factors that include, but are not limited to, a type of file, a file extension, a location where the file and/or information are stored, a type of memory that stores the file and/or information, an electronic device that includes the file and/or information, a size of the file and/or information, a number of times the user accessed and/or viewed the file and/or information, an amount of time the user spent accessing and/or viewing the file and/or information, whether the file and/or information was transmitted (such as being transmitted in an email), what keywords or user comments are associated with the file and/or information, what content is included in the file and/or information, how many users viewed and/or accessed the file and/or information, a name of the file and/or information, a date and/or age of the file and/or information, a date the file and/or information was last revised or visited or accessed, a name of a folder or directory in which the file and/or information is stored, whether the file and/or information was downloaded, the source of origination of the file, whether the file and/or information was purchased, the purchase price of the file and/or information, from where and/or whom the file and/or information was obtained, whether the file and/or information is located in primary storage or secondary storage or tertiary storage, whether the file and/or information is located in an archival system or already backed up, whether a copy of the file and/or information exists, whether the file and/or information are encrypted and/or compressed, a type of encryption algorithm and/or method of encryption (including operating system based, file system based, or file based), and/or a type of compression and/or method of compression (including operating system based, file system based, or file based).

According to block 320, the discovered files and/or information are sent to P2P storage based on the prioritization. Files and/or information with a higher priority are transmitted to the P2P storage before files and/or information with a lower priority. Alternatively, files and/or information with a lower priority are transmitted to the P2P storage before files and/or information with a higher priority.

Consider an example in which a user purchases a P2P software application with a tablet computer and joins a P2P storage network. The P2P software application automatically executes and discovers that the user owns the tablet computer, a smartphone, and a notebook computer. The software application then scans each of these electronic devices and generates an inventory of which files are stored on each of these devices. The software application further determines that the user spends about fifty percent of his computer time listening to music, twenty percent of his time downloading files from the internet, fifteen percent of his time editing photographs, and the remaining fifteen percent of his time devoted to a variety of different computer tasks. Based on this determination, the software application establishes a first priority for music files, a second priority for files downloaded from the internet, a third priority for photographs, and a fourth priority to other files. Based on this prioritization, the software application begins to transmit the files to the P2P storage network for backup.

Consider another example in which download files are provided a higher priority. An HPED runs a background application that backs up data to the P2P storage group at a relatively slower rate. The user begins to download a music file from the Internet. This download takes priority as active storage and receives a higher bandwidth for immediate backup to the P2P storage group.

Consider an example in which a user navigates to a website with an HPED, joins a P2P storage group, and receives fifty gigabytes of P2P storage for joining the network. Since memory in the HPED already stores ninety gigabytes of files, the HPED prioritizes these files to determine which files will be backed up to the P2P storage group and which files will not be backed up to the P2P storage group. The HPED assigns priorities as follows: a first highest priority to the files that have been accessed, viewed, edited, and/or moved within the last month, and a second highest priority to files that have been downloaded from the internet and/or purchased. Additionally, the HPED performs a keyword search and locates important and/or priority documents. By way of example, these documents includes files in a folder entitled "Important", files designated as do not delete, documents that were mentioned and/or transmitted in an email, and documents that have been viewed more than two times over the last year. These documents are designated as third highest priority. The first, second, and third highest priority documents account for forty five gigabytes of storage which means the user still has five gigabytes of unused P2P storage. The HPED provides the user with a list and/or identification of which files were transmitted to P2P storage.

Consider an example in which a user has a limited amount of P2P storage, and this amount is not sufficient to store all of the users file and/or information. A machine-learning user agent executes on a cloud server that is in communication with an HPED of the user, and this user agent determines which files are stored on the P2P storage, which files are removed or deleted from the P2P storage, and which files are denied from being stored on the P2P storage. The user agent continually or continuously monitors user interface (UI) actions with the HPED to learn and to decide how to manage the P2P storage. For instance, the user mentions in an email to his mother that he will soon resume his work on an article about the environment. Based on keywords extracted and/or analyzed from this email, the user agent locates a document that the user accessed and worked on several months ago about the environment and then transmits a copy of this document to P2P storage.

An amount of P2P storage that a user consumes can be based on various factors. For example, a P2P storage group can have rules that govern the amount of storage that each user consumes. For instance, users are allowed to consume an amount of P2P storage equivalent to an amount of P2P storage that the users allocate to the group. If a peer user desires to consume fifty gigabytes of P2P storage, then this peer user contributes fifty gigabytes of storage for use by the peers. As another example, the P2P storage group can allow users to purchase P2P storage. For instance, users of P2P storage are allowed to purchase P2P storage from the group for payment of a fee even if the users do not contribute storage to the group. As another example, the P2P storage group can allow users to contribute storage without also consuming P2P storage. For instance, users join the P2P storage group and then sell storage to the group. These users are members of the P2P storage group, but are contributors of storage and not also consumers of storage. As another example, the P2P storage group can allow users to contribute and consume different amounts of storage. For instance, a first user in the P2P storage group contributes one hundred gigabytes of storage and consumes one terabyte of storage, and a second user in the P2P storage group contributes two terabytes of storage and consumes no storage. As another example, a user can decide to prioritize quick accessibility to files or to prioritize a larger volume of storage accessible at a slower rate. The former prioritization is suitable for real-time applications, and the latter prioritization is suitable for backing up data. Furthermore, a slider switch can be provided to adjust what the user prefers. For instance, if the slider switch were in a left-most position, then access speed would be greatest but the amount of storage less (e.g., ten gigabytes). On the other hand, if the slider switch were in a right-most position, then the access speed would be at a much slower data rate, but the amount of storage amount more great (e.g., one hundred gigabytes).

Furthermore, users can adjust or chose one or more aspects or dimensions of the storage. These aspects or dimensions include, but are not limited to, volume of storage allocated to the network versus the amount of consumed by the user, speed (the time to write versus the time to read), cost (e.g., is the user paying for extra storage or receiving payment for supplying storage), and reliability (e.g., a statistical likelihood of the file being available at a certain time, such as a promised or guaranteed time). Each of these dimensions can be realized in a slider or other element that enables users to select a quantity of the dimension. For example, a user can choose a lower price but have a larger volume to consume with a slower rate of data retrieval. For example, a user can pay money to have a high rate of data retrieval and a high rate of read and write times.

Figure 4:
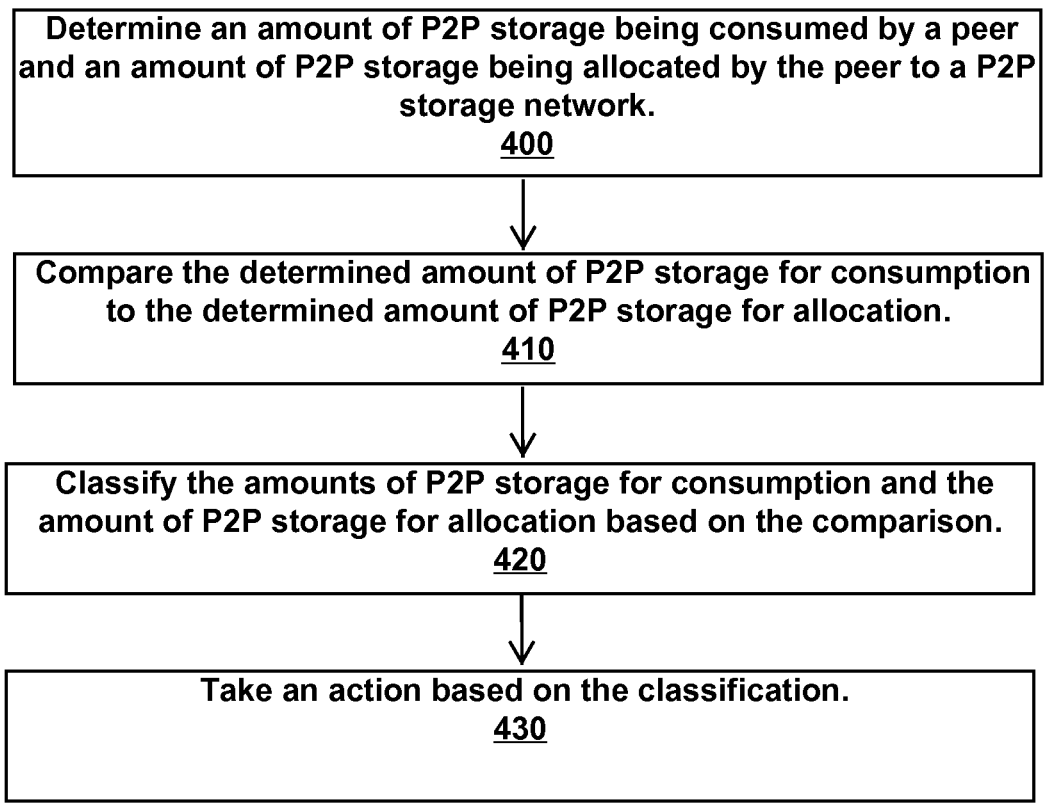
FIG. 4 is a method to classify a peer in a P2P storage network based on an amount of P2P storage consumed by the peer and an amount of P2P storage allocated by the peer to the network in accordance with an example embodiment.

FIG. 4 is a method to classify a peer in a P2P storage network based on an amount of P2P storage consumed by the peer and an amount of P2P storage allocated by the peer to the network.

According to block 400, a determination is made of an amount of P2P storage being consumed by a peer and an amount of P2P storage being allocated by the peer to a P2P storage network.

The amount of P2P storage being consumed by the peer and the amount of P2P storage being allocated by the peer to the P2P storage network can be actual amounts (e.g., amounts already or currently being consumed and allocated by the peer) or future amounts (e.g., amounts the peer is requesting to consume and allocate). For example, a peer of a P2P storage group can request an amount of P2P storage to consume, such as a peer requesting one hundred gigabytes of P2P storage. This peer already uses twenty gigabytes of P2P storage and is requesting an additional eighty gigabytes of P2P storage. As another example, the amount of P2P storage can be based on need, such as a user agent determining that the electronic devices of a user need one terabyte of P2P storage in order to backup data of the user. The user agent notifies the P2P storage network in order to secure this storage for the user. As another example, the amount of storage can be determined by calculating the total available capacity and then rationing to each user according to usage patterns, requests, payments, longevity of being a member of the group, etc.

As another example, an electronic device of a user joins the P2P storage network and proceeds to consume and allocate various different amounts of P2P storage. These amounts continually change over time as storage needs of the user change. An electronic P2P storage manager monitors and tracks the amounts of P2P storage being consumed and allocated by the user.

According to block 410, a comparison is made between the determined amount of P2P storage for consumption and the determined amount of P2P storage for allocation.

By way of example, the amounts are compared to determine whether the amount of P2P storage for consumption equals, is greater than, or is less than the amount of P2P storage for allocation. The amounts can also be compared to determine a percentage or ratio, such as dividing the amount P2P storage for consumption by the amount of P2P storage for allocation, dividing the amount of P2P storage for allocation by the amount of P2P storage for consumption, dividing the amount P2P storage for consumption by the amount of P2P storage for allocation plus the amount of P2P storage for consumption, and dividing the amount P2P storage for allocation by the amount of P2P storage for allocation plus the amount of P2P storage for consumption.

The amount of P2P storage for consumption and the amount of P2P storage for allocation can be compared against other amounts and/or criteria as well. For example, the amount of P2P storage consumption and the amount of P2P storage allocation are compared against a predetermined amount or an agreed amount. For instance, a user agent of a user joins the P2P storage network and agrees to ten terabytes of P2P storage consumption and zero P2P storage allocation. After a period of time, the P2P storage consumption of the user exceeds ten terabytes by one terabyte. A comparison of the agreed P2P storage consumption (i.e., ten terabytes) is made against the actual P2P storage being consumed (i.e., eleven terabytes), and this comparison reveals a surplus of one terabyte of P2P storage being consumed.

According to block 420, the amount of P2P storage for consumption and the amount of P2P storage for allocation are classified based on the comparison. This classification depends on to what numbers or amounts the amounts of P2P storage consumption and allocation are being compared. Some examples are provided below.

Consider an example in which a user joins a P2P storage network and agrees to consume and allocate equivalent amounts of P2P storage. During the course of storage usage, a comparison is made between the amount of P2P storage that the user consumes and the amount of P2P storage that the user allocates. This comparison reveals one of the following:

(1) The user consumes more P2P storage than the user allocates to P2P storage (consumption>allocation).
(2) The user consumes less P2P storage than the user allocates to P2P storage (consumption<allocation).
(3) The user consumes and allocates equal amounts of P2P storage (consumption=allocation).

Consider an example in which a software program joins a P2P storage network on behalf of its user and agrees to pay fees and/or receive payments based on P2P storage consumption and allocation. During the course of storage usage, a comparison is made between the amount of P2P storage that the user consumes and the amount of P2P storage that the user allocates. This comparison reveals one of the following:

(1) The user consumes P2P storage but allocates zero P2P storage (e.g., the user pays a monthly fee for the amount of P2P storage consumption).
(2) The user allocates P2P storage but consumes zero P2P storage (e.g., the user receives a monthly fee for the amount of P2P storage allocation).
(3) The user consumes more P2P storage than the user allocates to P2P storage (e.g., the user pays a monthly fee for the amount of P2P consumed−the amount of P2P storage allocated).
(4) The user allocates more P2P storage than the user consumes of P2P storage (e.g., the user receives a monthly fee for the amount of P2P allocated−the amount of P2P storage consumed).

According to block 430, an action is taken based on the classification. The action taken depends on one or more of the comparison, the classification, and rules governing the P2P storage network.

Examples of these actions include, but are not limited to, charging the user a fee, paying the user a fee, reducing or increasing an amount of P2P storage consumption, reducing or increasing an amount of P2P storage allocation, taking no action, notifying the user and/or a user agent of the user, terminating an agreement with the user, executing a clause and/or condition in an agreement with the user, redistributing data into or out of the P2P storage network, deleting data from the P2P storage network, adding data to the P2P storage network, re-prioritizing data stored or not stored in the P2P storage network, adjusting or altering a dimension of storage (such as increasing or decrease one of speed, volume, payments, or reliability).

Consider an example in which a user agrees to use one petabyte of P2P storage in which the user's data is distributed across various peers in the P2P storage network. The user is a paying customer that does not contribute or allocate any storage capacity to the P2P storage network. During the course of the agreement between the user and the P2P storage network, the user begins to consume more than one petabyte of P2P storage. This overconsumption causes an electronic P2P storage manager to shift data from the P2P storage network to another storage location, such as sending the surplus data to a data center, a server, or another P2P storage network. The P2P storage manager can also re-prioritize data in order to determine which data to move from the P2P storage network and which new data to accept into the P2P storage network.

Figure 5:
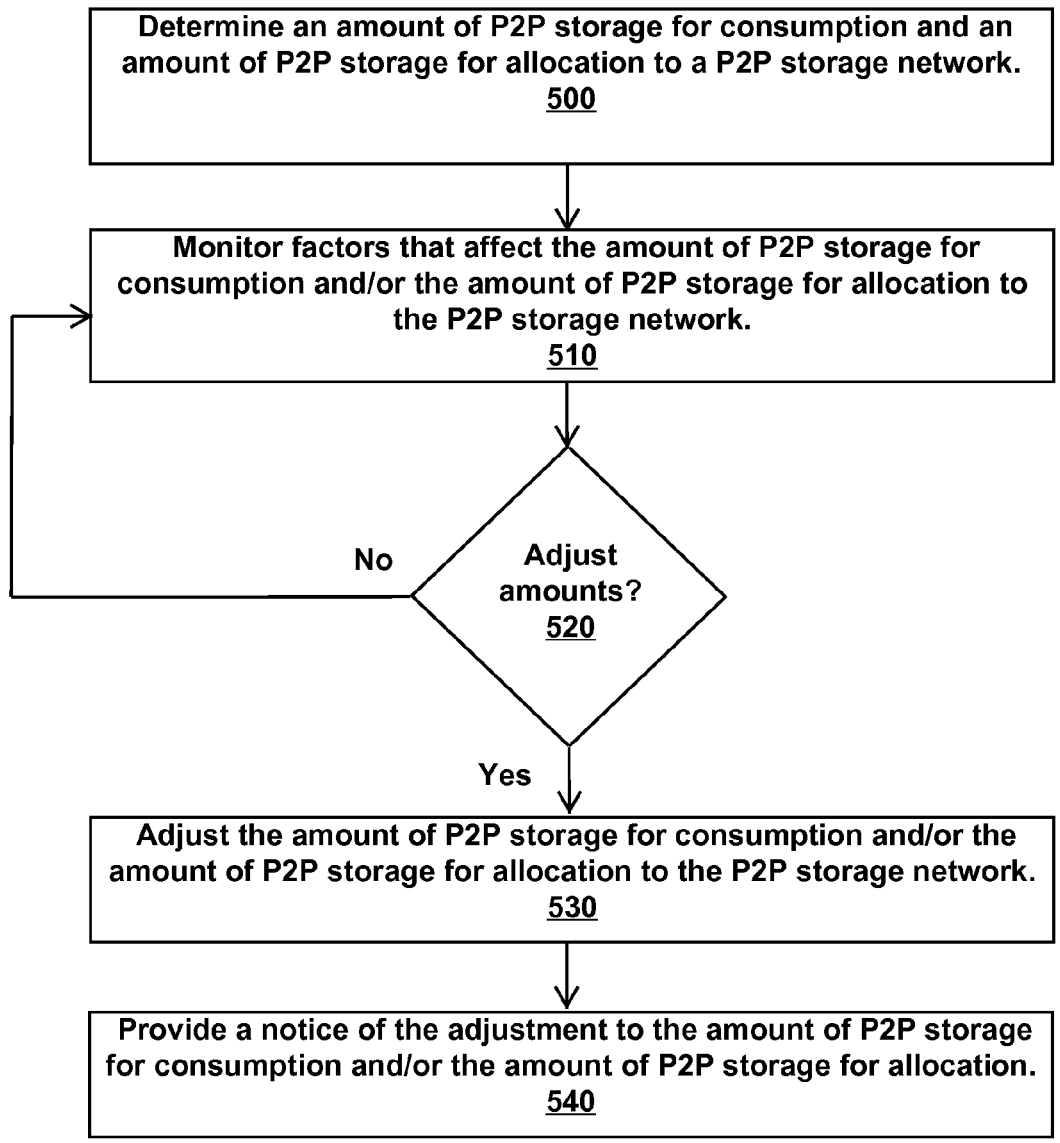
FIG. 5 is a method to monitor and adjust P2P storage consumption and/or allocation in accordance with an example embodiment.

FIG. 5 is a method to monitor and adjust P2P storage consumption and/or allocation.

According to block 500, a determination is made of an amount of P2P storage for consumption and an amount of P2P storage for allocation to a P2P storage network. These amounts include future and actual or current amounts of P2P storage being consumed and/or allocated in the P2P storage network.

According to block 510, factors are monitored that affect the amount of P2P storage for consumption and/or the amount of P2P storage for allocation to the P2P storage network. The factors can increase, decrease, or not affect the amount of P2P storage for consumption and/or the amount of P2P storage for allocation.

Example factors include, but are not limited to, a time of day, an amount of available or free memory on an electronic device, an amount of used memory on an electronic device, a percentage of available memory versus used memory on an electronic device, terms in a contract, an amount of P2P storage already being consumed by a user, an amount of P2P storage already being allocated by a user, a number of peers in a P2P storage network, bandwidth to upload and/or download data to and/or from a P2P storage network, and instructions from a user and/or user agent.

According to block 520, a determination is made whether to adjust the amount of P2P storage for consumption and/or the amount of P2P storage for allocation. When the answer to this determination is "no" flow proceeds to block 510. When the answer to this determination is "yes" flow proceeds to block 530.

According to block 530, an adjustment is made to the amount of P2P storage for consumption and/or the amount of P2P storage for allocation to the P2P storage network. The adjustments include, but are not limited to, increasing an amount of P2P storage for consumption, increasing an amount of P2P storage for allocation, decreasing an amount of P2P storage for consumption, decreasing an amount of P2P storage for allocation, increasing a bandwidth to upload and/or download P2P storage for consumption, increasing a bandwidth to upload and/or download P2P storage for allocation, decreasing a bandwidth to upload and/or download P2P storage for consumption, decreasing a bandwidth to upload and/or download P2P storage for consumption, increasing or decreasing storage reliability, increasing or decreasing payments made to or received from the user.

According to block 540, a notice is provided of the adjustment to the amount of P2P storage for consumption and/or the amount of P2P storage for allocation. This notification can be transmitted and/or provided to a node or a peer, a server, a computer, a P2P manager that manages the P2P storage network, a software application associated with the P2P storage network, a user, and/or the peers in the P2P storage network. By way of further example, the notification is displayed to a person on a display of an electronic device, stored in memory, and/or transmitted over a network to a person and/or an electronic device.

The amounts of P2P storage for consumption and allocation can be static (i.e., showing little or no change) and/or dynamic (i.e., able to change, in motion, and/or not steady). The amounts of bandwidth allocated to the P2P storage network (such as bandwidth allocated to receive data from peers and bandwidth allocated to transmit data to peers) can be static and/or dynamic. For example, the amounts of P2P storage for consumption and/or allocation and bandwidth can change continually, continuously, or periodically depending on one or more of the factors. Further, changes to the amounts can occur in real-time.

Consider an example in which an electronic device joins a P2P storage network and agrees to allocate twenty percent of its available solid state drive (SSD) storage to peers on the P2P storage network. An electronic manager on the P2P storage network periodically monitors the available SSD storage on the electronic device and adjusts the amount of allocated memory based on the monitoring. For instance, at one point in time, the manager determines that twenty percent of the SSD storage is twenty-seven terabytes; so this amount of memory is allocated to peers in the P2P storage network. Later in time, the manager determines that twenty percent of the SSD storage is thirty-one terabytes; so the manager adds four terabytes of memory to the P2P storage network (the total now being thirty one terabytes of memory allocated to the P2P storage network).

Consider an example in which an HPED of a user allocates and contributes 30 gigabytes of storage to a P2P storage network. A user agent of the user determines that the HPED has a surplus of available storage each night while the user is sleeping. During nighttime hours, the HPED remains on and connected to the Internet. The user agent instructs the P2P storage network that the HPED has an additional fifty gigabytes of storage that are available each night from 11:00 p.m. until 7:00 a.m. Subsequently, the HPED provides thirty gigabytes of storage to the P2P storage network during daytime hours and eighty gigabytes of storage during the night from 11:00 p.m. until 7:00 a.m. Thus, the amount of P2P storage that a peer allocates to the peers as peer storage is dynamic such that the amount increases during nighttime hours and decreases during daytime hours.

Consider an example in which thousands or hundreds of thousands of users increase their P2P storage allocation during nighttime hours. This surplus of temporary storage can be large, such as exceeding 1 petabyte, 5 petabytes, 10 petabytes, etc. This storage is allocated to the P2P storage network and is used as short term cache for processing large amounts of data, temporary backup, emergency backup, overflow backup, etc. If these users were distributed throughout different continents and hemispheres of the world, then the P2P storage network would have a continuous surplus of temporary P2P storage that is available to users in the P2P storage network.

Figure 6:
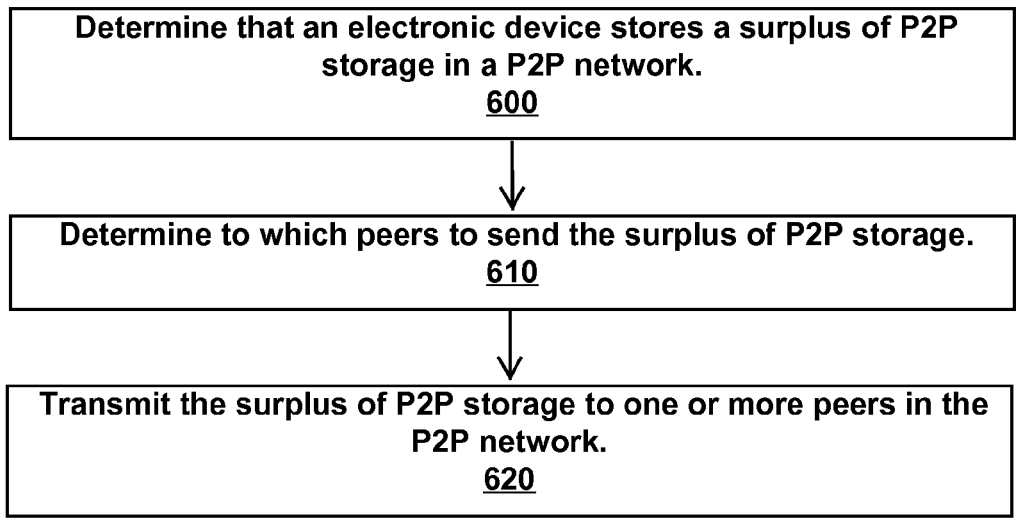
FIG. 6 is a method to determine which peers to send surplus P2P storage in accordance with an example embodiment.

FIG. 6 is a method to determine which peers to send surplus P2P storage.

According to block 600, a determination is made that an electronic device stores a surplus of P2P storage in a P2P network.

For example, an electronic device has a surplus of P2P storage when the electronic device stores more peer storage than it previously allocated to store. For instance, an electronic device has a surplus of P2P storage when the electronic device agrees to store ten gigabytes of P2P storage but actually stores twelve gigabytes of P2P storage.

As another example, a peer in the P2P storage network agrees to store one terabyte of data for peers in the network. After several months of storing this amount of data, the peer instructs a P2P manager for the network that the peer wants to reduce the storage to five hundred gigabytes. The peer thus has a surplus of five hundred gigabytes to distribute back to the network.

According to block 610, a determination is made to which peers to send the surplus of P2P storage.

According to block 620, the electronic device transmits the surplus of P2P storage to one or more peers in the P2P storage network.

Once a determination is made that an electronic device stores a surplus of peer storage, then this surplus is transmitted to one or more other peers that have not reached their allocated peer storage limits. For example, if an electronic device has a surplus of two gigabytes of P2P storage, then this electronic device transmits two gigabytes of data to one or more other peer electronic devices that have not reached their limit of P2P storage.

In an example embodiment, entire or complete files are stored to one or more peers. In another example embodiment, files are split or divided into segments or chunks that are stored across multiple different peers.

Figure 7:
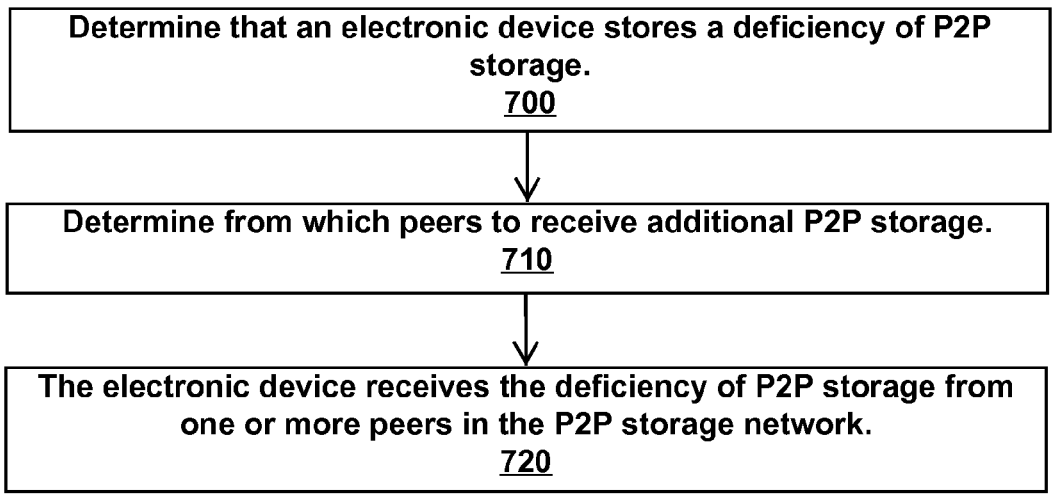
FIG. 7 is a method to request additional P2P storage when an electronic device has a deficiency of P2P storage in accordance with an example embodiment.

FIG. 7 is a method to request additional P2P storage when an electronic device has a deficiency of P2P storage.

According to block 700, a determination is made that an electronic device stores a deficiency of P2P storage.

For example, an electronic device stores a deficiency of P2P storage when the electronic device stores less peer storage or data than it desires to store. For instance, an electronic device stores a deficiency of P2P storage when the electronic device agrees to store ten gigabytes of P2P storage but actually stores eight gigabytes of P2P storage. As another example, the electronic device wants to increase its storage of peer data.

According to block 710, a determination is made from which peers to receive additional P2P storage.

According to block 720, the electronic device receives the deficiency of P2P storage from one or more peers in the P2P storage network.

Once a determination is made that an electronic device stores a deficiency of peer storage, then the electronic device transmits a notice of this deficiency to a central server, a designated peer, one or more peers, and/or all of the peers. Alternatively, the electronic device sends a request for additional storage to peers in the P2P storage network that have a surplus of peer storage. For example, if an electronic device has a deficiency of two gigabytes of P2P storage, then this electronic device requests two gigabytes of additional data from one or more other electronic devices in the P2P storage network (e.g., transmit the request to peers that surpassed their limit of P2P storage).

Figure 8:
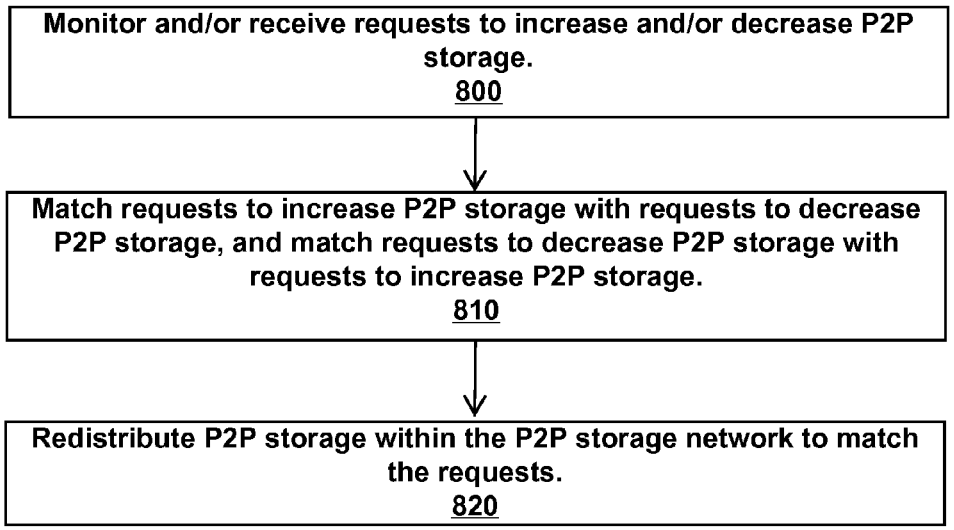
FIG. 8 is a method to redistribute P2P storage among peers in a P2P storage network in accordance with an example embodiment.

FIG. 8 is a method to redistribute P2P storage among peers in a P2P storage network.

According to block 800, requests to increase and/or decrease P2P storage are monitored and/or received.

According to block 810, requests to increase P2P storage are matched with requests to decrease P2P storage, and requests to decrease P2P storage are matched with requests to increase P2P storage.

According to block 820, P2P storage is redistributed within the P2P storage network to match the requests. P2P storage is transferred form one or more peers to one or more other peers to redistribute this storage among the peers.

Consider an example in which a peer in a P2P storage network stores fifty gigabytes of P2P storage. This peer desires to reduce this amount by ten gigabytes. Five other peers in the P2P storage network can each receive an additional two gigabytes of peer storage and still be within or under their peer storage limits. The peer having the ten gigabytes surplus transmits the extra ten gigabytes of storage to the five other peers such that each of these other peers receives two gigabytes of peer data from the peer.

Data in the P2P storage network can be redistributed, exchanged, and/or swapped among peers in the P2P storage network in order to more evenly distribute peer data among the peers. For example, each peer maintains an equivalent or approximately equivalent ratio of actual stored peer data to allocated or requested peer data. As another example, each peer maintains a desired or requested amount of stored peer data. As another example, each peer stores an amount of peer data that is not beyond a desired amount of peer data.

Consider an example in which a first peer allocates ten gigabytes of its storage to store data for the P2P storage network. The first peer actually stores six gigabytes, which represents a ratio of six gigabytes over ten gigabytes (i.e., six-tenths or sixty percent). A second peer allocates ten gigabytes of its storage to store data for the P2P storage network. The second peer actually stores eight gigabytes, which represents a ratio of eight gigabytes over ten gigabytes (i.e., eight-tenths or eighty percent). The second peer proportionally stores more data than the first peer. The first and second peers are matched together such that he second peer transfers one gigabyte of peer storage to the first peer so both the first and second peers each store seven gigabytes (i.e., seven-tenths or seventy percent). After the transfer, both the first and second peers store an equivalent ratio of peer data.

Consider another example in which a peer has one gigabyte too much of peer storage. The peer asks neighboring nodes whether they can accept a gigabyte of storage. The peer determines closest nodes and asks them first (e.g., the peer pings for neighboring nodes or reviews a list of available peers that can accept more storage). The discovery of other peers can be performed without a storage manager.

In an example embodiment, one or more P2P storage managers manage the P2P storage network. By way of example, responsibilities of the manager include, but are not limited to, one or more of monitoring P2P storage transactions between peers, receiving requests to join the P2P storage network, adding new peer members to the P2P storage network, removing existing peer members from the P2P storage network, tracking where data is stored among the peers, responding to requests from a peer to increase or decrease P2P storage for consumption and/or P2P storage for allocation, matching requests to increase amounts of stored peer data with requests to decrease amounts of stored peer data, determining how and where to redistribute peer storage among the peers, and executing and/or assisting in executing blocks discussed herein.

The P2P storage manager and/or the responsibilities of the manager can be designated as one or more of the peers, located in a central server, or shared or distributed across many or all of the peers.

Figure 9:
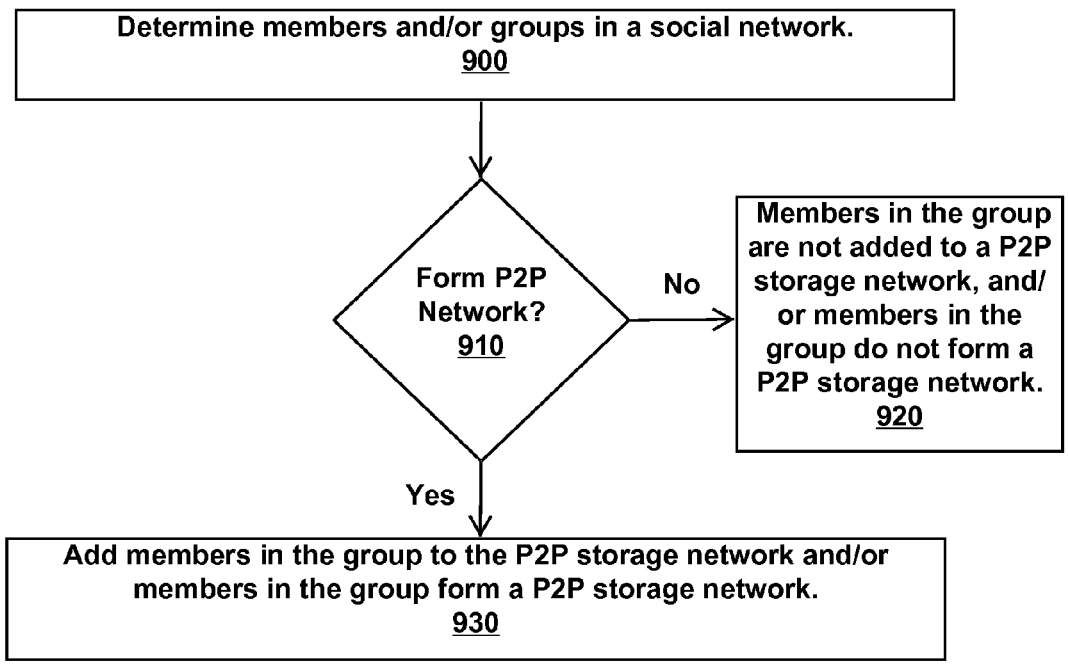
FIG. 9 is a method to add members of a social network to a P2P storage network in accordance with an example embodiment.

FIG. 9 is a method to add members of a social network to a P2P storage network.

According to block 900, a determination is made of members and/or groups in a social network.

The determination includes determining which users and/or members are in the social network, which users and/or members have a common interest with other users and/or members in the social network, which groups exist within the social network, which users and/or members belong to which groups within the social network, and which users and/or members are friends with which users and/or members. The determination can also include other information, such as how frequently users and/or members log into and/or use the social network, what activities users and/or members perform within the social network (activities such as posting, texting, emailing, uploading, downloading, viewing, talking, chatting, transmitting, storing, etc.), and what user profile information users and/or members have.

Consider an example in which a social network includes one hundred thousand total members. These members are formed into hundreds or thousands of smaller groups. Members in the groups can have a common interest, such as being friends, being in a common professional organization, being relatives of each other, etc.

According to block 910, a determination is made as to whether members in a group will form and/or join a P2P storage network.

If the answer to this determination is "no" then flow proceeds to block 920. Per block 920, members in the group are not added to a P2P storage network, and/or members in the group do not form a P2P storage network.

If the answer to this determination is "yes" then flow proceeds to block 930. Per block 930, members in the group are added to a P2P storage network, and/or members in the group form a P2P storage network.

The determination to join or form a P2P storage network can be provided to and/or answered by a user, a member, one or more members in the group, a user agent, an electronic device (such as an HPED of the user), a software program, an owner and/or operator of a social network website.

In an example embodiment, the P2P storage network and the social network are two different networks. The social network is based on and/or uses a client-server architecture, and the P2P storage network is based on and/or uses a P2P architecture. Furthermore, the two networks can be distinct from each other, separate from each other, and independent from each other. Further yet, these networks can be owned and operated by two different companies, or owned and operated by a same company.

Consider an example in which company A owns and operates a social network based on a client-server architecture. This social network is web-based and enables members to build social relations with other member over the Internet (e.g., members can share one or more of ideas, activities, photos, emails, texts, links, news, and interests, etc. with other members). Company B owns and operates a P2P storage network based on a P2P architecture. This P2P network enables member computers or peers to act as a client and a server for other member computers or peers. The peers in this P2P network allocate storage to the P2P network, and this storage is shared and/or used among the peers. Company A and company B enter into an agreement wherein groups of members in the social network of company A can form groups in the P2P network of company B. This agreement facilitates the formation of groups in the P2P network since the group of members is already formed. Furthermore, groups in the social network already have a commonality, such as being friends, relatives, business associates, etc. This commonality encourages the formation of groups in the P2P network since members in groups already know each other or already share a common interest (i.e., the common interest that bonded the members together to form a group in the social network). This commonality or common interest can also alleviate trusts issues if certain members in the social network are hesitant to join a P2P network in which users store data for each other and/or share computing resources with each other. Some users are more apt to join a P2P network with people that they already know (such as people already in their group in the social network) as opposed to people who are strangers and/or people with whom the users do not have a common interest.

Consider an example in which a user joins a social network that is based on a client-server architecture. After the user joins this social network, the user becomes a member. The member and/or the member's user agent are asked whether the member desires to join a P2P storage network as a peer. The member or user agent makes a decision as to whether to join the P2P storage network and responds to the request. Alternatively, the member automatically becomes a member of the P2P storage network (e.g., the act of joining the social network also causes the member to join the P2P storage network).

Consider an example in which a user is a member of the social network TWITTER. The user has a group of five hundreds friends. A request is sent to the user and each of the five hundred friends. This requests asks whether the user and the friends desire to form a P2P storage network that would include the five hundred friends. Other members of the social network could not join this group. Four hundred of the friends elect to form and join the P2P storage network. This P2P storage network includes the four hundred friends as peers. These peers then allocate bandwidth and memory to the P2P storage network and use the P2P storage network for consumption, such as temporary storage, permanent storage, backup storage, emergency storage, etc. This newly formed P2P storage network functions as a P2P storage network with members or peers that are also friends in a group on TWITTER.

Consider an example in which a first member of the social network FACEBOOK sends a friend request to second member of the social network. The first member belongs to a P2P storage network (named AlphaWon) that includes friends of the first member on the social network. When the second member accepts the friend request of the first member, the second member is asked whether the second member desires to join AlphaWon. If the second member agrees to join Alpah-Won and accepts the friend request, then the second member simultaneously becomes a friend of the first member and becomes a member of AlphaWon.

Consider another example in which a user is a member of a social network and belongs to a group within the social network. Members in the group form a group in a P2P storage network so the members can share and store data with each other as peers in the P2P storage network.

Example embodiments include P2P storage networks in which members or peers are strangers (i.e., members or peers are unknown or unacquainted with each other).

Consider an example in which a social network has more than one hundred thousand members. The social network reviews the user profiles of the members and classifies the members that have a common interest. Based on this classification, the social network forms groups of members that are compatible to be members together as peers in a P2P storage network. The social network can automatically form P2P groups with the members. Alternatively, the social network can provide recommendations to the members for which P2P group the social network determined the member should belong. For instance, based on a review of a first user profile, a first member is provided with a recommendation to join P2P social network named AlphaOne; based on a review of a second user profile, a second member is provided with a recommendation to join P2P social network named BetaOne.

Example embodiments also include P2P storage networks in which members or peers know each other and/or are acquainted with each other. For example, such members or peers are friends on a social network, belong to a common group on a social network, are friends and/or relatives of each other, are business associates and/or acquaintances, belong to a common club or organization or association, attended a common school (such as graduated from a same university or attend class together in a school), etc.

Example embodiments also include P2P storage networks in which members or peers share a common interest. These members or peers may or may know each other. Some examples of common interest include, but are not limited to, users that have commonality with regard to a school attended, living in a city or state or country, owning a make or model of an electronic device, belonging to an organization or club or association, working at a particular location and/or for a particular employer, demographic information (such as age, gender, race, ethnicity, mobility, home ownership, marital status, employment status, disabilities, income level, etc.), an affiliation (such as religious, political, social, etc.) of the user and/or other individual, a membership, and an occupation or hobby.

Figure 10:
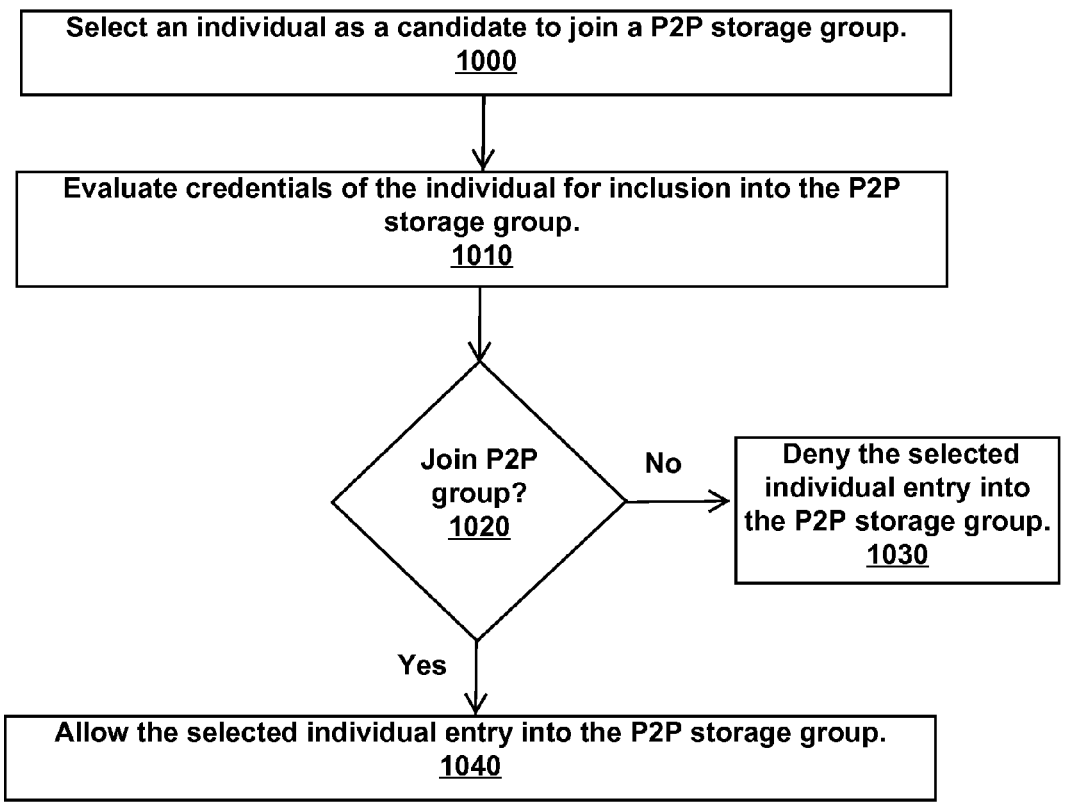
FIG. 10 is a method to recruit individuals to join a P2P storage group in accordance with an example embodiment.

FIG. 10 is a method to recruit individuals to join a P2P storage group.

According to block 1000, an individual is selected as a candidate to join a P2P storage group.

The selection of an individual to join the P2P storage group can be random. For example, individuals are randomly selected to join a particular P2P storage group. Alternatively, the selection of an individual to join the P2P storage group can be based on one or more factors or criteria. For example, individuals are selected to join a particular P2P storage group if the individuals have a common interest with one or more members in the P2P storage group. Additionally, one or more users in the P2P storage group selects an individual that is known (such as selecting a friend, a relative, a business associate, a co-worker, a person that is a member or friend in a social network, etc.).

According to block 1010, credentials of the individual are evaluated for inclusion into the P2P storage group.

According to block 1020, a determination is made as to whether the selected individual can join the P2P storage group. If the answer to this determination is "no" then flow proceeds to block 1030, and the selected individual is denied entry into the P2P storage group. If the answer to this determination is "yes" then flow proceeds to block 1040, and the selected individual is allowed entry into the P2P storage group.

When the credentials satisfy one or more criteria and/or requirements then the selected individual is extended an offer to join the P2P storage group and/or is allowed to join the P2P storage group. The criteria can vary widely depending on what rules are provided to govern inclusion of the P2P storage group.

Consider an example in which the criteria for entry into the P2P storage group are as follows: allow an individual to join the P2P storage group if the individual is related to a member or peer already in the group. For instance, John is a member of the P2P storage group, and John has a brother Paul. Paul's credential of being John's brother would satisfy the criteria of being related to an existing member of the P2P storage group. Thus, Paul would be allowed to join the P2P storage group.

Consider an example in which the criteria for entry into the P2P storage group includes belonging to FACEBOOK and being a friend of a particular member named John. Other members of FACEBOOK that are also friends with John can join the P2P storage group to which John is a member. The friends of John form the P2P storage group and function as peers in the P2P storage network. Thus, John shares P2P storage with friends on his FACEBOOK. Members of the social network not friends with John are denied entry into the P2P storage group.

Consider an example in which the criteria for entry into the P2P storage group include having a common interest with one or more existing members of the P2P storage group. For example, a group of employees of Company A form a P2P storage group. Anyone that is an employee of Company A is eligible to join this P2P storage group.

The credentials of an individual for inclusion into a particular P2P storage group can be evaluated using other methods as well. Consider an example in which users or peers maintain a P2P storage resume. The storage resume of a user is evaluated in order to determine whether the user is an acceptable member for the P2P storage group. By way of example, such resumes includes historic information regarding previous P2P transactions that the user or peer made. For instance, storage resumes include one or more of information about previous P2P storage groups that the user belonged to and/or participated in, an amount of P2P storage the user consumed, an amount of P2P storage the user allocated to peers, a bandwidth the user provided to receive peer data and transmit data to peers, an amount of time the user was online (e.g., in communication with a network so as to transmit and/or receive peer data), a frequency or occurrence of P2P storage transactions, a length of time as a member or peer of another P2P storage group, a name of previous P2P storage group to which the user was a member, whether the user violated contractual and/or agreed terms and conditions in a previous P2P storage group, whether the user previously consumed more peer memory than the user allocated to other peers, how long the user stored data for the peers, and whether the user paid any fees.

Consider an example in which a user belongs to a P2P storage group that desires to add more peers in order to increase storage capacity across the group. The group desires to add users that have a history of providing reliable P2P storage with an allocation of at least one terabyte. An HPED of a user of the P2P storage group contacts other electronic devices and/or user agents and attempts to recruit new members to the P2P storage group. The HPED requests these other electronic devices and/or user agents to provide the HPED with their P2P storage resume. The HPED reviews the resumes to determine whether the candidates satisfy the criteria of providing reliable P2P storage with an allocation of at least one terabyte. When the HPED discovers a candidate that satisfies these criteria, the HPED provides the candidate with an offer to join the P2P storage group.

Consider an example in which a P2P storage group desires to add more reliable peers to the group. The P2P storage group evaluates P2P storage resumes of individuals that are candidates to be included in the group. Based on the evaluation of the storage resumes, the individuals are recruited to join the P2P storage group. For instance, individuals with a high ranking or with a good P2P storage history are extended an offer to join the P2P storage group.

Example embodiments include methods in which one or more users control which other individuals become members of the P2P storage groups. Such users can select the other individuals to become members and deny other individuals an opportunity to become members. Alternatively, this control and/or selection can be performed by an electronic device, a user agent, or a software program.

In order to evaluate a candidate for a P2P storage group, the storage resume and/or credentials of the candidate can be evaluated and ranked. A ranking system can be used to provide a score with regard to different categories and/or with regard to other candidates. By way of example, categories can include the historic information regarding previous P2P transactions discussed herein (e.g., one category is an amount of P2P storage the user will consume; one category is an amount of P2P storage the user will allocate; one category is bandwidth the user will utilize to receive and transmit data; one category is an amount of time the user will be online; etc.). Each category can include a range of numbers that rank the user or give a score for the category (such as 1 to 5, 1 to 10, or 1 to 100), and candidates are scored in each category. The sums of the scores in each category are added together to determine a total score. The total scores for different candidates can be compared to evaluate and/or compare candidates with respect to each other. A total score can also be compared to a scale to classify a candidate (such as candidates with a total score of 90-100 are deemed excellent P2P storage peers; candidates with a total score of 80-89 are deemed good P2P storage peers; candidates with a total score of 70-79 are deemed average P2P storage peers; candidates with a total score of 60-69 are deemed below average P2P storage peers; candidates with a total score of 59 or less are deemed unacceptable P2P storage peers.).

A ranking of a candidate and/or peer can also change over time. Consider an example in which a peer joins a P2P storage group and has a score of 82. While acting as a peer in this P2P storage group, the user is an excellent member of the group (e.g., the user continually remains online, stores a large amount of peer data, has a quick response time to storage requests, reliably stores peer data, etc.). After a period of time, the user's score is re-computed to a score of 93. The user's P2P storage resume is also updated to reflect the user's interactions with the P2P storage network. Additionally, the user's score can be included in the resume.

A ranking system, a scoring system, a classification system, resumes, and/or historic P2P storage interaction enable users to be evaluated for inclusion in P2P storage groups. P2P storage groups can have different criteria for membership. Some groups, for example, may desire users with a specific score/ranking or a specific storage history. Another group, for example, may desire users with a specific attribute, such as including users if they live in a certain geographical area, own a particular make or model electronic device, belong to a specific religious organization, etc.

A ranking system, a scoring system, a classification system, resumes, and/or historic P2P storage interaction can also be used to determine how peer storage is distributed within a P2P storage group.

Figure 11:
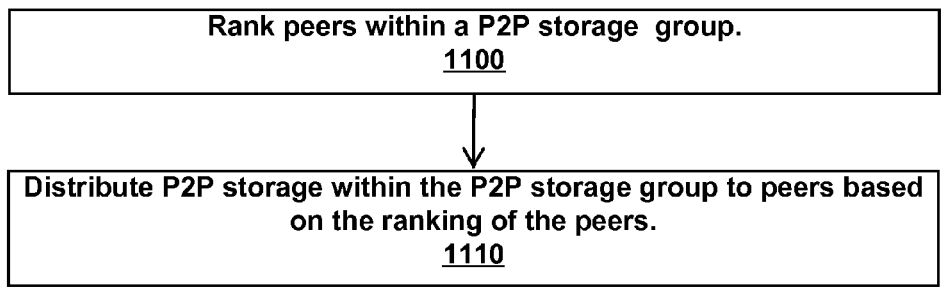
FIG. 11 is a method to distribute P2P storage among peers based on a ranking of the peers in accordance with an example embodiment.

FIG. 11 is a method to distribute P2P storage among peers based on a ranking of the peers.

According to block 1100, peers within a P2P storage group are ranked. This rank can be based on a ranking system, a scoring system, a classification system, resumes, and/or historic P2P storage interaction. For example, peers in the P2P storage network are ranked with respect to the how long a user remains online, how much peer data the user consumes and stores, how much bandwidth the user provides, how reliably the user stores peer data, how quickly the user's storage device responds to peer requests, whether the user pays a storage fee, etc.

According to block 1110, P2P storage within the P2P storage group is distributed to peers based on the ranking of the peers. The ranking of a peer, for example, can determine whose data is sent to the peer, how much data the peer is allowed to store for the group, how much data the group is allowed to store for the peer, how long a peer maintains or stores data, how much money the peer pays to be a member of the group, how much money the peer receives to store other peer data, what membership benefits the peer gets from the group, etc.

Figure 12:
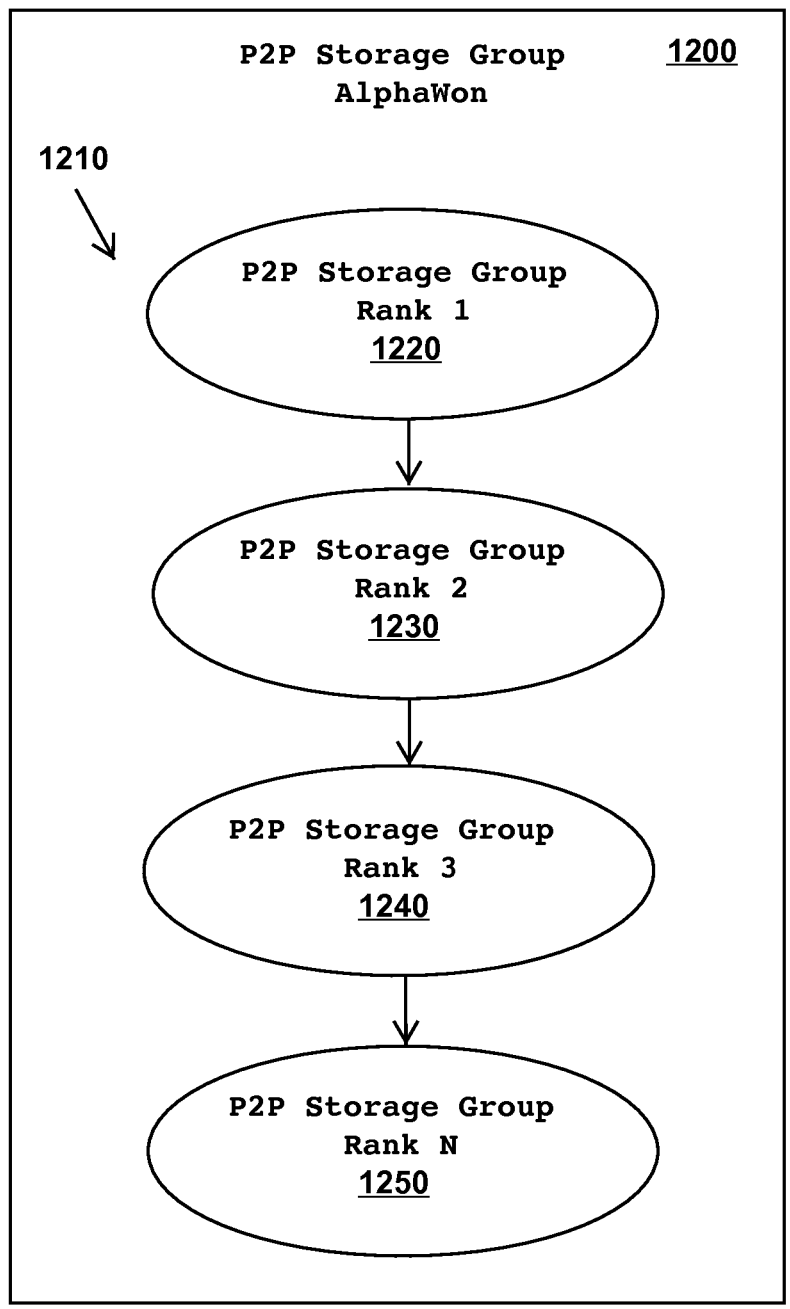
FIG. 12 is a storage group in which peers distribute data among themselves based on their ranking within the group in accordance with an example embodiment.

The rankings can also be used to form groups within the P2P storage group. FIG. 12 is a storage group in which peers distribute data among themselves based on their ranking within the group.

FIG. 12 shows a hypothetical P2P storage group 1200 (named AlphaWon). The members or peers in AlphaWon are ranked, and the rankings are used to form subgroups 1210 or groups of peers within the group AlphaWon. Each group includes peers with a similar or common ranking. A first group 1220 includes P2P storage members with a ranking of 1 (a first highest ranking). A second group 1230 includes P2P storage members with a ranking of 2 (a second highest ranking). A third group 1240 includes P2P storage members with a ranking of 3 (a third highest ranking). The number of groups can continue as shown with group N at 1250.

The storage group 1200 is a hierarchy that limits or restricts which groups share peer data with each other. For example, peers or members in a group share and/or store data with each other, and not with peers or members in another group. For instance, peers in the first group 1220 share data with each other; peers in the second group 1230 share data with each other; peers in the third group 1240 share data with each other. Alternatively, the group rankings are used to prioritize how data is distributed. For example, peers in the first group 1220 receive a higher priority for data requests than peers in the second group 1230.

The storage group 1200 can include a single group that is divided into the plural subgroups. For example, the storage group 1200 is formed of members that also form a group in a social network.

The rankings and data distribution restrictions in the storage group 1200 provide an incentive for members to be reliable storage hosts for other members. As a member continues to perform reliable storage, the ranking of the member increases, and the member moves up the hierarchy. For example, if a member in the third group 1240 exhibits reliable peer storage over time, then this member moves into the second group 1230. This move is beneficial to the member since the second group 1230 is ranked higher than the third group 1240 and thus has better peers with whom to share data.

The subgroups are placed and ranked in the hierarchy based on an ability of peers within the subgroup to reliably conduct P2P storage transactions. A higher ranks signifies a subgroup with peers that exhibit more reliable storage transactions, such as longer online times, higher bandwidth allocations to storage requests, shorter replies times to storage requests, etc. Peers are placed in the subgroups based on analysis of their current and/or previous P2P storage transactions.

In an example embodiment, users can prohibit or blacklist peers from being able to store data on the user's electronic device. Consider an example in which users in a peer group believe that a member in the group stores malicious or inappropriate data. These users can blacklist this member from conducting storage or resource transactions with the users (e.g., the member is blacklisted on the user's electronic devices such that these electronic devices do not accept any personal data that belongs to the member).

Figure 13:
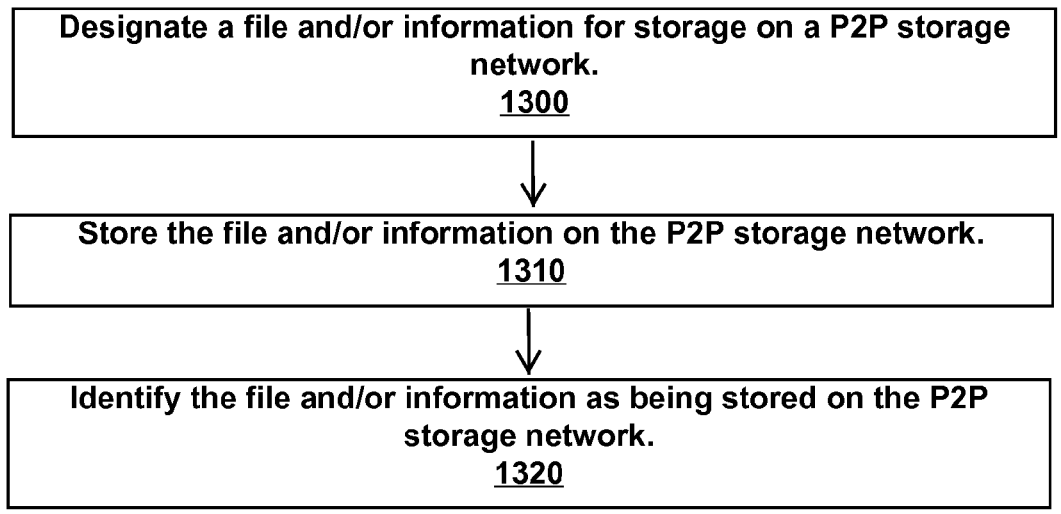
FIG. 13 is a method to identify files stored on a P2P storage network in accordance with an example embodiment.

FIG. 13 is a method to identify files stored on a P2P storage network.

According to block 1300, a file and/or information are designated for storage on a P2P storage network. For example, a user selects a file on an HPED and designates this file to be stored on the P2P storage network. As another example, as a file is downloaded from the internet, the file is automatically designated for storage on the P2P storage network. As another example, all files with a specified extension are automatically backed up on the P2P storage network.

According to block 1310, the file and/or information are stored on the P2P storage network. The file and/or information designated for peer storage is transferred or copied from the current storage device (such as an HPED or an electronic device of a peer) to one or more storage devices of other peers.

According to block 1320, the file and/or information is identified as being stored on the P2P storage network.

Once a file and/or information is stored on the P2P storage network, this file and/or information is identified so it can be recognized as a file stored on the P2P storage network. For example, files stored on the P2P storage network can be visually identified and/or distinguished from other files not stored on the P2P storage network. For instance, files stored on the P2P storage network appear blue or green or another color that signifies them as being stored on the P2P storage network. As another example, files stored on the P2P storage network are provided in a list, stored in a specific folder, given a certain name, etc. As another example, files stored on the P2P storage network are provided with an insignia or indicia to identify them as being stored on the P2P storage network, such as placing a small check mark (✓) or other symbol next to or on the file.

Consider an example in which some pictures in a picture folder are backed up on a P2P storage network. Once a picture is copied to the P2P storage network, the original picture in the picture folder is highlighted or marked to visually identify this picture as being one that is backed up on the P2P storage network. When a user opens the folder and sees the names of the pictures or the thumbnails of the pictures, the user can readily see which pictures are backed up to the P2P storage network and which pictures are not backed up to the P2P storage network.

Figure 14:
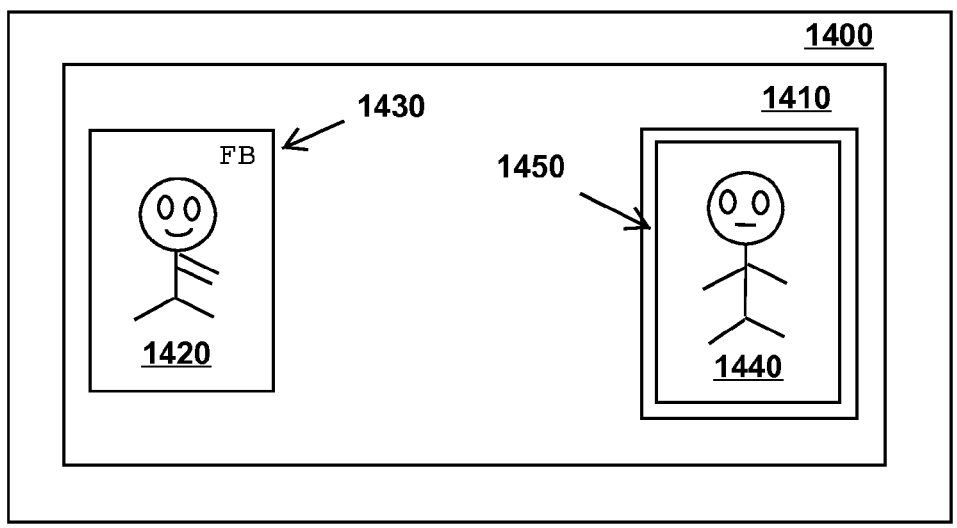
FIG. 14 is an electronic device with a display that displays pictures that are marked to visually identify them as being stored on a P2P storage network in accordance with an example embodiment.

FIG. 14 is an electronic device 1400 with a display 1410 that displays pictures that are marked to visually identify them as being stored on a P2P storage network. Picture 1420 is a thumbnail of a picture that includes a small insignia 1430 in a corner of the picture to indicate that the pictures is backed up on a P2P storage network. For illustration, the insignia 1430 is shown as FB. The term FB identifies the file as being stored on a P2P network and also provides a name of the P2P network (e.g., the name of the P2P network storing the file is "FB"). Thus, the insignia both identifies the file as being stored on a P2P network and provides the name of this network. Picture 1440 is a thumbnail of a picture that includes a colored border 1450 around a periphery of the thumbnail. This colored border 1450 identifies the picture as being stored on the P2P storage network.

Different border colors can identify different networks. Consider an example in which a user belongs to three different P2P networks. Files stored to P2P network AlphaWon are colored with a blue border; files stored to P2P network BetaWon are colored with a green border; and files stored to P2P network GammaWon are colored with a yellow border. Thus, the color identifies the file as being stored on a P2P network and identifies on which particular P2P network the file is stored.

Example embodiments include designating files stored on a P2P storage network as being public, private, or semi-private. A file stored on the P2P storage network with a designation as being public is accessible to other members or peers of the P2P storage network. As such, these members or peers can perform actions on the file, such as viewing the file and copying the file. A file stored on the P2P storage network with a designation as being private is not accessible to other members or peers of the P2P storage network. Other members or peers would not be able to take action on the file, such as view, copy, edit, move, etc. A file stored on the P2P storage network with a designation as being semi-private is accessible to other members or peers but has restrictions. For example, a semi-private file can be viewed by some members and not other members, can be viewed but not copied, can be viewed but not downloaded, etc.

Consider an example in which a user takes a picture with his HPED, and the picture is automatically backed up from the HPED to a P2P storage network. The picture is designated as being semi-private. This designate means that the picture can be viewed and copied by other users who are both peers in the P2P storage network and friends of the user in the user's social network FACEBOOK. When another user meets the requirements associated with the picture, then the other user has access rights or privileges to the picture on the P2P storage network.

As noted, management operations of the P2P storage network or group can be central (such as from a server) or provided with one or more peers. Consider an example in which a P2P storage group includes a storage map that identifies data stored in the P2P storage group, such as identifying a name of each file, a size, a location, a type, and other metadata. Each member or peer in the P2P storage network includes a copy of the storage map. Alternatively, one or more members or peers in the P2P storage group maintain a copy of the storage map (such as a peer designated as a P2P manager). When a member or peer desires information from the storage map, the member or peer sends a query request to the member maintaining the storage map.

Figure 15:
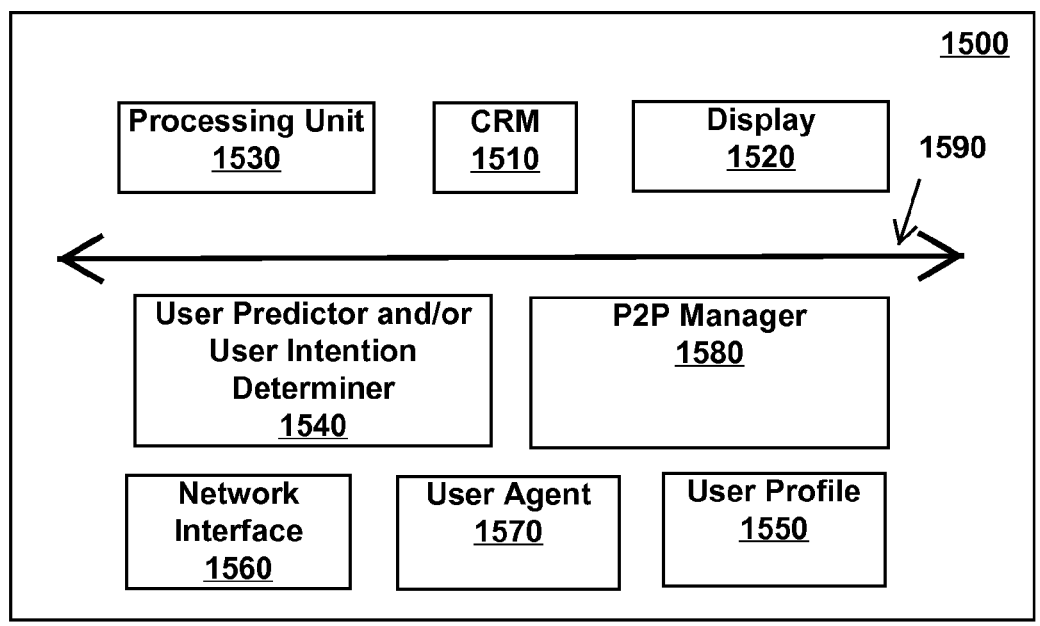
FIG. 15 is an electronic device in accordance with an example embodiment.

FIG. 15 is an electronic device 1500 in accordance with an example embodiment. The electronic device includes components of computer readable medium (CRM) or memory 1510, a display 1520, a processing unit 1530, a user predictor and/or user intention determiner 1540, a user profile 1550, a network interface 1560, a user agent 1570, a P2P manager 1580, and one or more buses or communication paths 1590. FIG. 15 shows these components in a single electronic device. Alternatively, one or more of these components can be distributed or included in various electronic devices, such as some components being included in an HPED and/or a peer, some components being included in a server, some components being included in storage accessible over the Internet, components being in various different electronic devices that are spread across a network, etc.

The processor unit 1530 includes a processor (such as a central processing unit, CPU, microprocessor, application-specific integrated circuit (ASIC), etc.) for controlling the overall operation of memory 1510 (such as random access memory (RAM) for temporary data storage, read only memory (ROM) for permanent data storage, and firmware). The processing unit 1530 communicates with memory 1510 and performs operations and tasks that implement one or more blocks of the flow diagrams discussed herein. The memory 1510, for example, stores applications, data, programs, algorithms (including software to implement or assist in implementing example embodiments) and other data.

The network interface 1560 provides a mechanism for the electrical device 1500 to communicate with other electrical devices, computers, or systems. For example, the network interface 1560 enables the electrical device to transmit data through a wired or wireless connection to a network, such as the Internet and/or a cellular network.

Blocks and/or methods discussed herein can be executed and/or made by a user, a user agent of a user, a software application, an electronic device, a computer, a computer system, a P2P network or system, and/or an electronic manager. Furthermore, blocks and/or methods discussed herein can be performed without knowledge of the user and/or without instruction from the user. Consider an example in which a user is without knowledge of when an action occurs but has provided instruction for the action. Consider an example in which the user has knowledge of an action but did not instruct the action. Consider an example in which a user agent of a user performs an action without the user having knowledge of the action and without the user providing the user agent with specific instruction to perform the action.

Determinations by a software application, an electronic device, and/or the user agent can be modeled as a prediction that the user with take an action. For example, an analysis of historic events, personal information, geographic location, and/or the user profile provides a probability and/or likelihood that the user will take an action (such as determining whether to enroll a user in P2P storage, determining an amount of P2P storage for consumption and allocation, determining which files to copy to P2P storage, and determining how to execute blocks in methods discussed herein). By way of example, one or more predictive models are used to predict the probability that a user would take, determine, or desire the action. The predictive models can use one or more classifiers to determine this probability. Example models and/or classifiers include, but are not limited to, a Naive Bayes classifier (including classifiers that apply Bayes' theorem), k-nearest neighbor algorithm (k-NN, including classifying objects based on a closeness to training examples in feature space), statistics (including the collection, organization, and analysis of data), support vector machine (SVM, including supervised learning models that analyze data and recognize patterns in data), data mining (including discovery of patterns in datasets), artificial intelligence (including systems that use intelligent agents to perceive environments and take action based on the perceptions), machine learning (including systems that learn from data), pattern recognition (including classification, regression, sequence labeling, speech tagging, and parsing), knowledge discovery (including the creation and analysis of data from databases and unstructured data sources), logistic regression (including generation of predictions using continuous and/or discrete variables), group method of data handling (GMDH, including inductive algorithms that model multi-parameter data) and uplift modeling (including analyzing and modeling changes in probability due to an action).

As used herein, a "client-server" is an architecture model in which a client computer and/or program initiates requests over a network to a server computer and/or program that responds to the requests. The client contacts the server to use a service and/or resource that the server provides.

As used herein, a "common interest" is an interest, feature, activity, and/or attribute that is shared by and/or belongs to two or more people or entities.

As used herein, the term "information" includes communication and/or reception of knowledge and/or intelligence, and knowledge obtained from investigation, study, and/or instruction. Information also includes data, such as information in numerical form that can be digitally transmitted and/or processed. Thus, information includes raw data and unorganized facts that can be processed, and also includes processed, organized, and structured, such as data being processed and presented in a useful context.

As used herein, "peer-to-peer" or "P2P" is a distributed computer architecture that partitions tasks among peers. Each electronic device or computer in the P2P network is a node in which a portion of its resources (such as one or more of processing power, storage, and bandwidth) are available to other peers or nodes in the network without a need for central coordination by servers or hosts. Peers or nodes in the network can be suppliers of resources, consumers of resources, and/or suppliers and consumers of resources with the other peers.

As used herein, a "peer-to-peer network" or "P2P network" is a computer network in which one or more computers in the network can act as a client and a server for other computers in the network. The network allows shared access to various resources (such as files and peripherals) without a need for a central server. By way of example, computers in the network use a similar, same, or compatible software program to communicate with each other and to access files and resources stored on computers or peripherals of each other. P2P networks include embodiments in which the network does not include servers (such as in a client-server architecture) but includes peers that function both or simultaneously as clients and servers to other peers in the network. P2P networks also include embodiments in which the network does include servers and clients (such as in a client-server architecture).

As used herein, "P2P storage" is storage that is implemented over a P2P network or with a P2P architecture.

As used herein, a "social network" is a social structure in which users communicate with each other over a network with electronic devices. The social network facilitates the building of social relations among users who share backgrounds, familial relations, business relations, interests, and/or connections. The social network includes one or more of representations and/or information about the users (such as user profiles, photos, videos, etc.) and a platform (such as a web-based platform) that allows the users to communicate with each other over one or more networks (such as using email and/or instant messages over the Internet) and/or share information with other users in the social network. The social network can be based on a client-server architectures, a P2P architecture, or a combination of client-server and P2P architectures.

As used herein, a "user" is a human being, a person.

As used herein, a "user agent" is software that acts on behalf of a user. User agents include, but are not limited to, one or more of intelligent agents (agents that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

As used herein, a "user profile" is personal data that represents an identity of a specific person or organization. The user profile includes information pertaining to the characteristics and/or preferences of the user. Examples of this information for a person include, but are not limited to, one or more of personal data of the user (such as age, gender, race, ethnicity, religion, hobbies, interests, income, employment, education, etc.), photographs (such as photos of the user, family, friends, and/or colleagues), videos (such as videos of the user, family, friends, and/or colleagues), and user-specific data that defines the user's interaction with and/or content on an electronic device (such as display settings, application settings, network settings, stored files, downloads/uploads, browser activity, software applications, user interface or GUI activities, and/or privileges).

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures.

Further yet, specific numerical data values (such as specific quantities, numbers, categories, etc.) or other specific information should be interpreted as illustrative for discussing example embodiments. Such specific information is not provided to limit example embodiments.

What is claimed is:

1. A method executed by a computer system, comprising:
hosting, by servers in the computer system, a social networking website for users to upload photos, to communicate with each other, and to form different peer-to-peer (P2P) storage groups that include groups of the users of the social networking website;
building, by a user profile builder in the computer system, user profiles of the users;
recommending, by a P2P storage manager in the computer system and to each of the users, one of the P2P storage groups for the users to join based on analysis of the user profiles of the users;
prioritizing, by user agents in the computer system, files that are stored on handheld portable electronic devices of the users to determine which of the files are priority files;
transmitting, by the user agents in the computer system, the priority files to the one of the P2P storage groups to which the users belong in order to backup the priority files;
comparing, by the P2P storage manager in the computer system, an amount of P2P storage that a user consumes versus an amount of P2P storage that the user allocates to the P2P storage groups; and
providing, by the P2P storage manager, compensation to the user when the amount of P2P storage that the user allocates to the P2P storage groups is greater than the amount of P2P storage that the user consumes.

2. A computer system, comprising:
servers that host a social networking website for users to upload photos, to communicate with each other, and to form peer-to-peer (P2P) storage networks that include groups of the users of the social networking website;
a user profile builder that builds user profiles of the users;
a P2P storage manager that communicates with the servers, analyzes the user profiles of the users, and recommends to the users a P2P storage group for the users to join based on analysis of the user profiles of the users; and
user agents that communicate with the servers and the P2P storage manager, discover files stored on handheld portable electronic devices of the users, prioritize the files to determine which of the files are priority files, and transmit the priority files to the P2P storage group to which the users belong in order to backup the priority files, wherein the user agents monitor an amount of storage space of the users, determine when the storage space is becoming full, and automatically enroll the users in one of a plurality of P2P storage groups in order to increase an amount of the storage space available to the users.

3. A method executed by a computer system, comprising:
hosting, by servers in the computer system, a social networking website for users to upload photos, to communicate with each other, and to form different peer-to-peer (P2P) storage groups that include groups of the users of the social networking website;
building, by a user profile builder in the computer system, user profiles of the users;
recommending, by a P2P storage manager in the computer system and to each of the users, one of the P2P storage groups for the users to join based on analysis of the user profiles of the users;

prioritizing, by user agents in the computer system, files that are stored on handheld portable electronic devices of the users to determine which of the files are priority files;

transmitting, by the user agents in the computer system, the priority files to the one of the P2P storage groups to which the users belong in order to backup the priority files;

analyzing, by a user predictor in the computer system, a storage history of a user;

predicting, by the user predictor in the computer system, an amount of P2P storage that the user needs; and providing, by the user predictor and to the P2P storage manager, the amount of P2P storage that the user predictor predicts the user needs.

4. The method of claim 3 further comprising:

evaluating, by a user agent of a user, the P2P storage groups that the user could join;

deciding, by the user agent of the user, to join a P2P storage group for the user without instruction from the user to join the P2P storage group.

5. The method of claim 3 further comprising:

receiving, by the P2P storage manager in the computer system, a request from a first peer in the P2P storage groups to increase an amount of P2P storage that the first peer stores for other peers;

receiving, by the P2P storage manager in the computer system, a request from a second peer in the P2P storage groups to decrease an amount of P2P storage that the second peer currently stores for the other peers;

matching, by the P2P storage manager in the computer system, the request from the first peer with the request from the second peer so the second peer sends P2P storage to the first peer.

6. The method of claim 3 further comprising:

forming, by the P2P storage manager in the computer system, a hierarchy of subgroups from a single group within the P2P storage groups;

ranking, by the P2P storage manager in the computer system, the hierarchy of subgroups based on an ability of a user to reliably conduct P2P storage transactions;

placing, by the P2P storage manager in the computer system, the users in the subgroups based on an analysis of previous P2P storage transactions conducted by the users.

7. The method of claim 3 further comprising:

storing, by a user agent in the computer system, a file in the one of the P2P storage groups;

adding, by the computer system, an insignia to visually identify the file as being stored in the one of the P2P storage groups and to visually identify a name of the one of the P2P storage groups.

8. A computer system, comprising:

servers that host a social networking website for users to upload photos, to communicate with each other, and to form peer-to-peer (P2P) storage networks that include groups of the users of the social networking website;

a user profile builder that builds user profiles of the users;

a P2P storage manager that communicates with the servers, analyzes the user profiles of the users, and recommends to the users a P2P storage group for the users to join based on analysis of the user profiles of the users;

a user predictor that analyzes a user profile of a user, predicts an amount of P2P storage to allocate to the user based on analysis of the user profile, and predicts a P2P storage group that the user would desire to join based on the analysis of the user profile; and user agents that communicate with the servers and the P2P storage manager, discover files stored on handheld portable electronic devices of the users, prioritize the files to determine which of the files are priority files, and transmit the priority files to the P2P storage group to which the users belong in order to backup the priority files.

9. The computer system of claim 8, wherein the P2P storage manager receives a request from a first electronic device of a first user to reduce an amount of P2P storage being consumed by the first user, receives a request from a second electronic device of a second user to increase an amount of P2P storage consumed by the second user, and matches the request from the first electronic device to reduce the amount of P2P storage with the request from the second electronic device to increase the amount of P2P storage.

10. The computer system of claim 8, wherein the user agents decide which P2P storage group the users will join and how much P2P storage the users will consume without instruction from the users on which P2P storage group to join and how much P2P storage to consume.

11. The computer system of claim 8, wherein an amount of P2P storage that a user in the P2P storage group allocates to other users in the P2P storage group is dynamic such that the amount increases during nighttime hours and decreases during daytime hours.

12. The computer system of claim 8, wherein the P2P storage manager:

receives a request from a first peer to increase an amount of peer data that the first peer stores;

receives a request from a second peer to decrease an amount of peer data that the second peer stores;

matches the first peer with the second peer so the first peer sends peer data to the second peer.

13. A computer system, comprising:

servers that host a social networking website for members to upload photos, to communicate with each other, and to form P2P storage networks that include groups of the members of the social networking website;

a user profile builder that builds user profiles of the members;

a P2P storage manager that communicates with the servers and recommends one of the P2P storage networks to each of the members based on analysis of the user profiles of the members; and user agents that communicate with the servers, discover files stored in memories of handheld portable electronic devices of the members, prioritize the files to determine which of the files are important files to the members, and distribute the important files to one of the P2P storage networks to which the members belong so the important files are backed up to the P2P storage networks, wherein the P2P storage manager recruits some of the members to join one of the P2P storage networks based on an evaluation of P2P storage resumes of the members and based on a ranking of the members as P2P storage members.

14. The computer system of claim 13, wherein the user agents change an amount of storage that the users allocate to the P2P storage networks such that the amount of the storage increases during nighttime hours and decreases during daytime hours.

15. The computer system of claim 13, wherein the user agents determine which of the files are the important files based on keywords extracted and analyzed from emails of the members.

16. The computer system of claim 13, wherein the P2P storage manager compares an amount of P2P storage that a member consumes with an amount of P2P storage that the member allocates to the P2P storage networks, and provides a payment to the member when the amount of the P2P storage that the member allocates to the P2P storage networks is greater than the amount of the P2P storage that the member consumes.

17. The computer system of claim 13 wherein thumbnails of the important files are marked with insignia that visually shows the important files as being stored in one of the P2P storage networks and visually identifies a name of the one of the P2P storage networks.

\* \* \* \* \*